[19] United States Patent
Worthington

(10) Patent No.: US 8,181,110 B2
(45) Date of Patent: May 15, 2012

(54) DOM BASED MEDIA VIEWER

(75) Inventor: Cristian Alfred Worthington, Vancouver (CA)

(73) Assignee: i-fax.com Inc.

( * ) Notice: Subject to any disclaimer, the term of this patent is extended or adjusted under 35 U.S.C. 154(b) by 354 days.

(21) Appl. No.: 12/558,432

(22) Filed: Sep. 11, 2009

(65) Prior Publication Data

US 2010/0235765 A1 Sep. 16, 2010

Related U.S. Application Data

(60) Provisional application No. 61/105,379, filed on Oct. 14, 2008.

(51) Int. Cl.
*G06F 13/00* (2006.01)
*G06F 15/00* (2006.01)

(52) U.S. Cl. .................................. 715/716; 715/726

(58) Field of Classification Search .................. 715/700, 715/733, 750–753, 851–855, 719–723, 726–728, 715/736–738
See application file for complete search history.

(56) References Cited

U.S. PATENT DOCUMENTS

| | | | |
|---|---|---|---|
| 5,796,952 A | 8/1998 | Davis et al. |
| 5,813,007 A | 9/1998 | Nielsen |
| 5,999,912 A | 12/1999 | Wodarz et al. |
| 6,026,429 A | 2/2000 | Jones et al. |
| 6,175,862 B1 | 1/2001 | Chen et al. |
| 6,243,725 B1 | 6/2001 | Hempleman et al. |
| 6,248,946 B1 | 6/2001 | Dwek |
| 6,427,175 B1 | 7/2002 | Khan et al. |
| 6,763,345 B1 | 7/2004 | Hempleman et al. |
| 7,058,892 B1 | 6/2006 | MacNaughton et al. |
| 7,562,287 B1 | 7/2009 | Goldstein et al. |
| 7,593,868 B2 | 9/2009 | Margiloff et al. |
| 2001/0010046 A1 | 7/2001 | Muyres et al. |
| 2001/0018858 A1 | 9/2001 | Dwek |
| 2001/0047384 A1 | 11/2001 | Croy |

(Continued)

FOREIGN PATENT DOCUMENTS

CA 2564735 A1 11/2005

(Continued)

OTHER PUBLICATIONS

How the Internet Works. Gralla, Preston. Que Publishing, Indianapolis, IN, 2001. ISBN 0-7897-2582-7. Chapters 1-4, 22, Glossary, Index, front and back matter included.

(Continued)

*Primary Examiner* — Cao "Kevin" Nguyen
(74) *Attorney, Agent, or Firm* — Bruce M. Green; Oyen Wiggs Green & Mutala LLP

(57) ABSTRACT

A system by which a computer user can view or listen to selected media objects, such as videos or podcasts or Internet radio, located in the Document Object Model ("DOM") of a web page. The system is able to isolate the media objects selected by a user or the media objects stipulated in a database containing a description of the location of the objects. The system has the ability to display the specified media objects in a toolbar or console. The system is able to play multiple media objects concurrently and to independently control the sound produced by multiple media objects and also has the capability of performing a pre-recorded set of instructions to cause an object in the DOM to execute, such as playing a video or opening a file.

21 Claims, 20 Drawing Sheets

U.S. PATENT DOCUMENTS

| | | |
|---|---|---|
| 2002/0091762 A1 | 7/2002 | Sohn et al. |
| 2004/0049737 A1 | 3/2004 | Hunt et al. |
| 2004/0205448 A1 | 10/2004 | Grefenstette et al. |
| 2004/0268261 A1 | 12/2004 | Elliott et al. |
| 2006/0112341 A1 | 5/2006 | Shafron |
| 2006/0129937 A1 | 6/2006 | Shafron |
| 2006/0161863 A1 | 7/2006 | Gallo |
| 2006/0190561 A1 | 8/2006 | Conboy et al. |
| 2006/0230156 A1 | 10/2006 | Shappir et al. |
| 2006/0253794 A1 | 11/2006 | Wilson |
| 2007/0033269 A1 | 2/2007 | Atkinson et al. |
| 2007/0112627 A1 | 5/2007 | Jacobs et al. |
| 2008/0028474 A1 | 1/2008 | Horne et al. |
| 2008/0109785 A1 | 5/2008 | Bailey |
| 2008/0183534 A1 | 7/2008 | Joo |
| 2009/0132942 A1 | 5/2009 | Santoro et al. |
| 2009/0254529 A1* | 10/2009 | Goldentouch .................. 707/3 |
| 2010/0185513 A1 | 7/2010 | Anderson et al. |

FOREIGN PATENT DOCUMENTS

WO    2009055692 A2    4/2009

OTHER PUBLICATIONS

"FTC Alert on InternetALERT". Kuchinskas, Susan. InternetNews.com, Sep. 3, 2003. Available from <www.internetnews.com/ec-news/article.php/3403961>.

"Five Major Categories of Spyware". Barrett, Robertson. Consumer-Reports Webwatch, Oct. 21, 2002. Available from <http://www.consumerwebwatch.org/dynamic/privacy-investigations-categories-spy.cfm>.

Internet Archive Wayback Machine, archive of "Common Gateway Interface". Archived at <http://web.archive.org/web/20010410030952/hoohoo.ncsa.uiuc.edu/cgi/intro.html>. Archived Apr. 10, 2001.

* cited by examiner

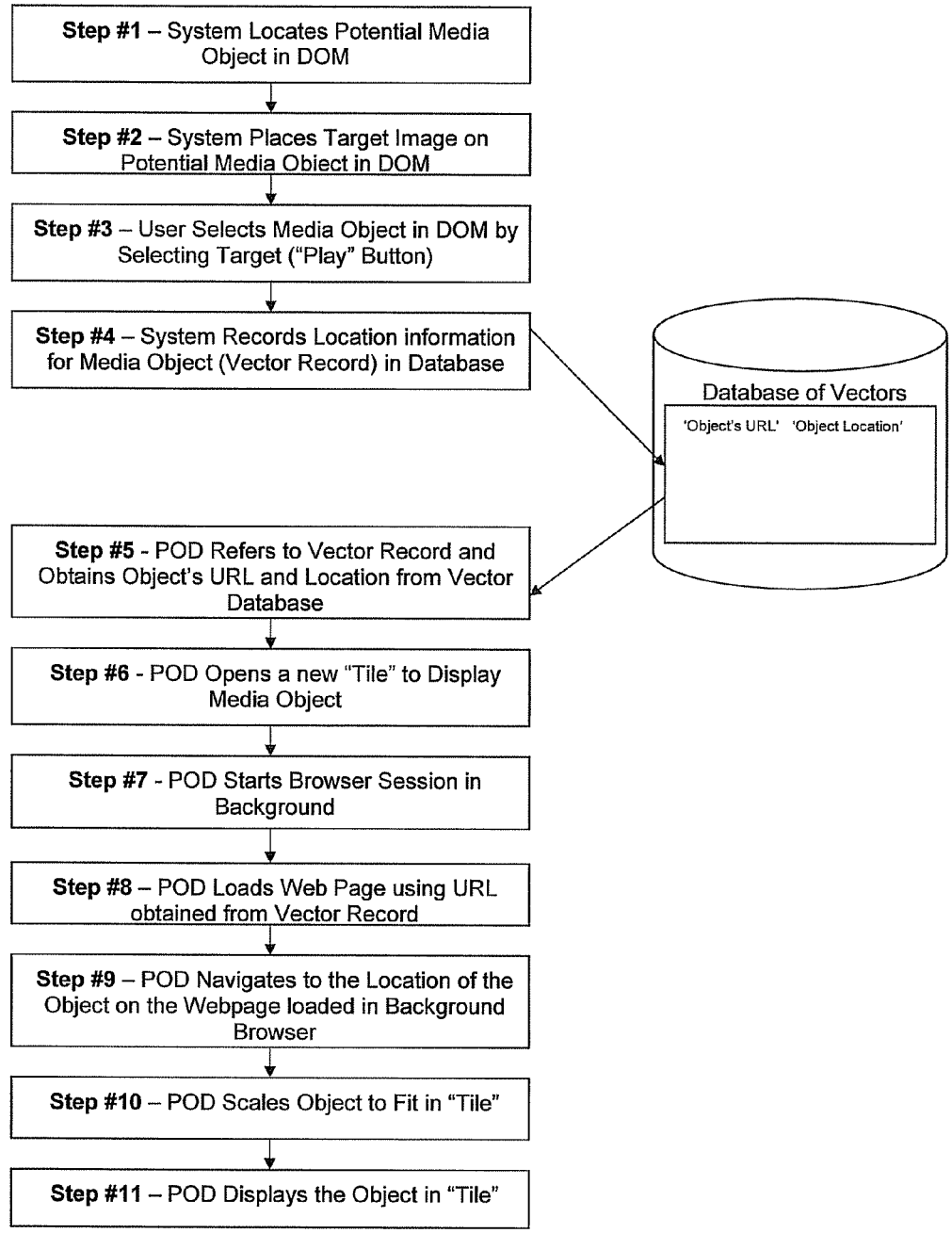
Fig. 1 – Displaying Media Object (DOM Method)

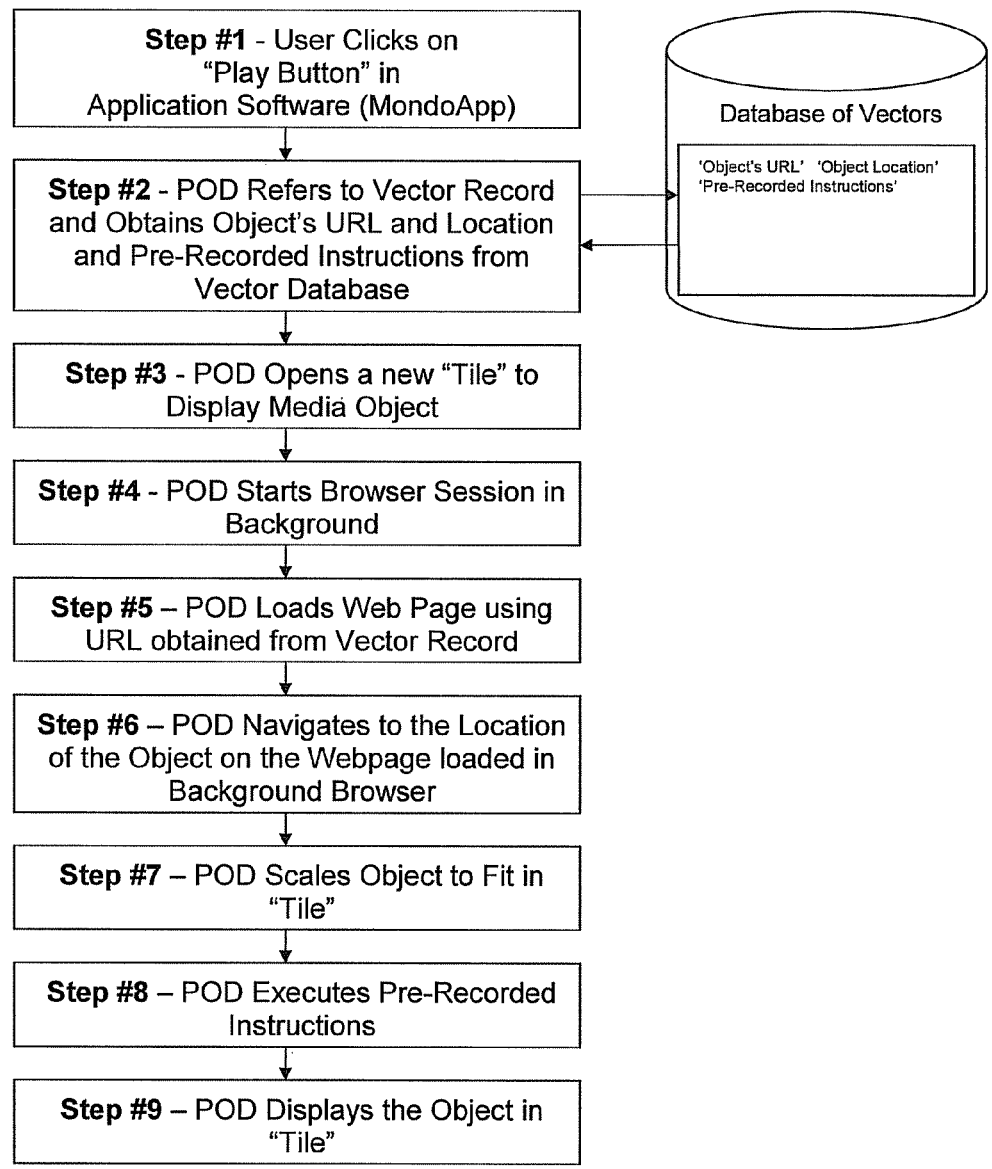

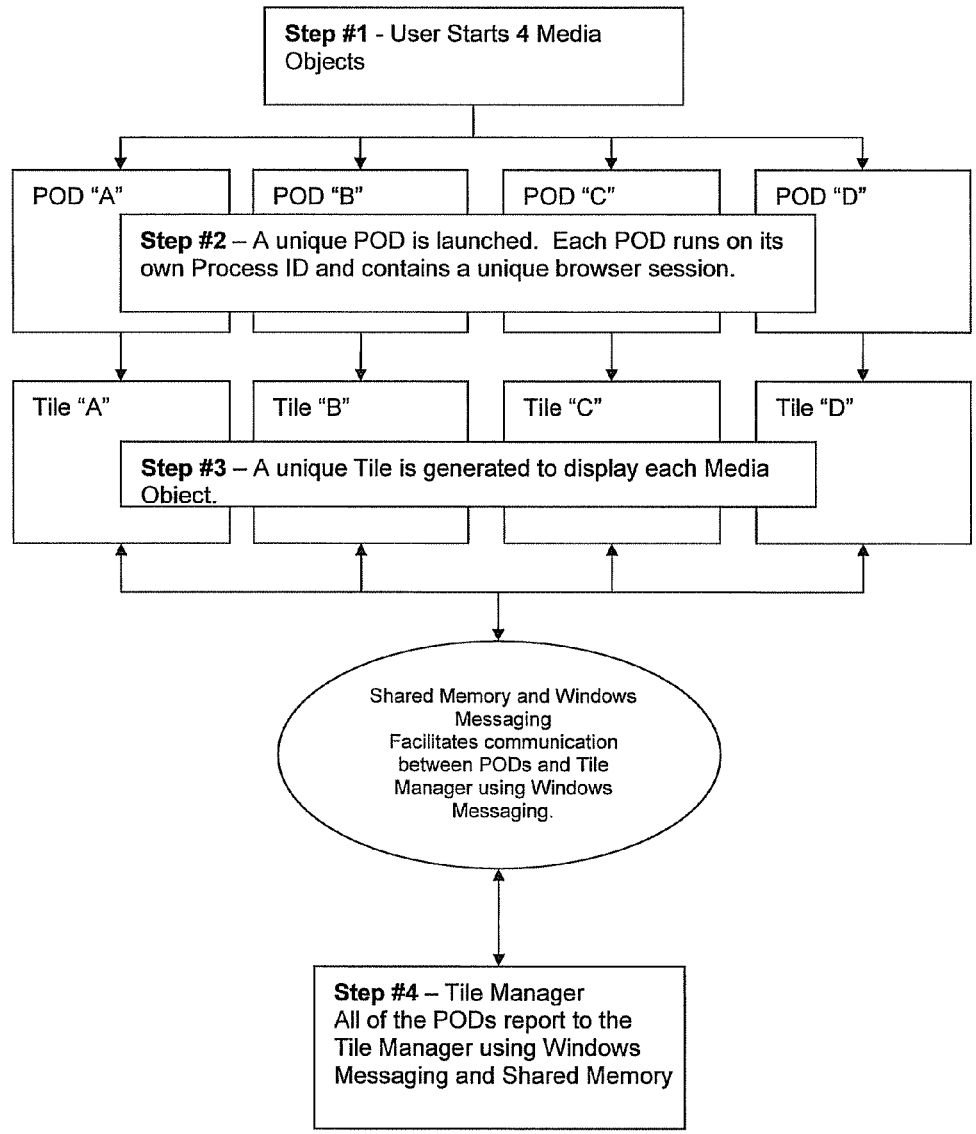
Fig. 3 – Sound Signaling Architecture

Fig. 6 – Playing or Saving a Media Object (General Description)

Fig. 7 – Recording Media URLs and Vectors in the DOM

Fig. 8 – Insert Hooks and Images in Media Objects in DOM

Fig. 9 – Playing Media Object

Fig. 10 – Save Media Object

Fig. 12 – Saving Media Object in Media List

Fig. 13 – Managing Media Lists

Fig. 14 – Subscribing to Media Lists

Fig. 15 – Distributing Media Lists

Fig. 16 – Detecting the End of a Media Object

DOM BASED MEDIA VIEWER

REFERENCE TO RELATED APPLICATION

The present application claims the benefits, under 35 U.S.C. §119(e), of U.S. Provisional Application Ser. No. 61/105,379 filed Oct. 14, 2008, entitled "USER DRIVEN SYSTEM FOR INDEXING AND PLAYING MEDIA ON THE WEB" which is incorporated herein by this reference.

TECHNICAL FIELD

The invention relates to the field of internet web browsers and media players and more particularly to the fields of Domain Object Models (DOM) in Web Browsers and Media Players.

BACKGROUND

Web Browsing

There are several web browsers in use today, including Internet Explorer, Firefox and Chrome. All browsers essentially function in the same way, by allowing a user to visit a web address and view the content on the web page. When a user visits a web page and sees a Media Object such as Video, Radio or RSS, the user can play the Media Object in one of two ways:
 1. Play the media from within the web page (as an embedded component), for example a YouTube video that appears within the web page upon which it is found. In this case, the user must keep the web browser on the webpage that is hosting the video in order to watch the video, as the video is embedded in the web page.
 2. By launching a "Media Player" and watching the video in a window provided by the "Media Player" (as a stand alone application), such as Windows Media Player, Apple Quicktime or Real Player. In this case, the user must have the "Media Player" running as a foreground application in order to be able to see the video.

DOM in Web Browsers

Web Browsers are software programs that can be used to visit a web site and produce a graphic representation of a web page called a Document Object Model (DOM).

The DOM is rendered by the web browser by means of computer code designed to interpret HTML and other file formats delivered by a web server to the Web Browser. The resulting DOM can contain many "Objects", including text, images and video.

The Web Browser displays Video Objects in the DOM by employing a Media Player to interpret the data related to the video.

Media Players

Media Players are software programs that decode, play and display data files containing sound and/or video. Media Players generally run in one of two ways:
 1. Independent Operation—The Media Player is executed as a stand alone program to display a file indicated by a user. When a Media Player runs "independently", the media is generally displayed inside a stand alone window.
 2. Dependent Operation—The Media Player is executed by a browser visiting a web page. During "dependent operation" the Media Player runs as a "child" process of the browser and the Media Object is rendered in the Document Object Model (DOM). When the Media Player runs "dependently", the media is displayed as part of the DOM and is not easily extracted for independent viewing.

A large percentage of the media available on the web today is presented using Dependent Operation of the Media Player, forcing the user to have the Web Browser open to the web page in which the video is contained. There are many reasons why a computer user may wish to direct media to a Media Player running independently of the browser, so the media can be watched without the surrounding Objects in the DOM. For example:
 1. ToolBar Display—If the user wishes to display the Media Object in a ToolBar as described in U.S. patent application Ser. No. 12/210,202 entitled "SYSTEM FOR MANAGING MULTI-MEDIA CONTENT ACROSS MULTIPLE SOFTWARE APPLICATIONS", filed 14 Sep. 2008, which is incorporated herein by reference.
 2. Console Display—If the user wishes to display the Media Object in a stand alone Media Player or window.

Most users visit web pages for brief periods of time, often as little as a few seconds. By contrast, most Media Objects, such as Video, Audio and RSS, are consumed over longer periods of time. For example, a user may spend 15 seconds reading the content on a web page, but may be expected to spend 10 minutes watching a video clip referenced within the web page.

When a User visits a web page containing a video clip, it is either difficult or sometimes impossible for the "User" to move to a subsequent web page while continuing to watch the video. While it is possible for the user to watch the video in a separate window, for example by using a Media Player or a separate window on the desktop, the user must then minimize the size of the browser to allow room for both applications to run side by side, in effect reducing the space on the screen for the web browser.

There is a temporal incompatibility between the text and the Media Objects found on most web pages. Users wishing to consume Media must generally remain on a web page to watch a video long after they have lost interest in the surrounding text and graphics.

In some cases, a user with a conventional Web Browser and Media Player may be able to obtain the URL for videos and other Media Objects by examining the data in the DOM or the data in the HTML of the web page containing the video object. When the user obtains the URL of the video object, the user may be able to play the video "independently" in a stand alone application, such as a ToolBar or Console.

However, in most cases the URL for videos and other objects contained within web pages cannot be obtained from the DOM or the HTML of a web page and passed to a Media Player. For example, most Video Objects displayed within the DOM's of web pages are the result of processes (such as AJAX—Asynchronous Java and XML) that are executed concurrently with the creation of the DOM. In these cases a URL cannot be obtained and passed to an independent software application.

Although some automated tools have been developed to uncover the URLs hidden behind AJAX by analyzing the Document Object Model (DOM) of a web page, these efforts are easily defeated if the web developer employs:
 a. the use of dynamic URLs or cookies, causing any URL that is automatically obtained by analyzing the DOM to expire and be useless to subsequent processes that attempt to use the URL, or b. the use of AJAX code that is deliberately designed to be difficult for an automated process to detect the URL, such as graphics that are not easily recognized by an automated system.

Additionally, automated tools are unable to determine the difference between Media Objects in the DOM that are useful or relevant and content that is irrelevant. For example, a pre-roll advertisement may precede the content desired by the user. A system that uncovers the URL of the pre-roll advertisement will tend to ignore the URL of the subsequent video which is desired by the user.

A typical web page can contain many Media Objects, such as Flash or Windows Media Player elements, but many of these Media Objects may simply contain graphical devices used to make the web page look appealing to a user and do not contain the type of Media that a user may wish to have indexed for future retrieval. A system that relies on an automated tool analyzing the DOM will regularly identify pieces of a web page such as advertisements along with video content, without regard to what is actually contained within each Media Object. A user relying upon the location of a Media Object that contains large numbers of irrelevant entries would soon find the experience frustrating.

As a result, web content that is hidden behind AJAX and other similar schemes cannot be reliably identified automatically by Web Crawlers and is invisible to Media Players running independently of the web browser.

Many web sites employ the use of proprietary Media Players which cannot be easily replicated by a "stand alone" Independent Media Player. For example, video which is encrypted can only be decoded by a proprietary Media Player which is often delivered to the Browser during the execution and rendering of the web page or DOM. In these cases, the Object rendered in the DOM relies upon the Browser interacting with the server using AJAX (Asynchronous Java and XML) or a similar process to obtain the instructions needed to display the Media Object (referred to herein as "pre-recorded instructions").

A significant percentage of valuable Media on the Internet cannot be obtained directly by means of a URL because web developers employ methods such as:

1. Cookies that can only be obtained by visiting the URL of the web page that houses the Media Object before accessing the Media Object's URL.
2. Dynamically Assigned URLs that expire and cannot be accessed by subsequent visitors to a web page.

Methods such as cookies and dynamic URL assignment defeat conventional methods of locating content on the web (such as Search Engines, Directories, Portals and Favorites), because the URL address of the Media Object content is not static and results in an "expired cookie" or "broken link" when the user tries to reach the content.

The Web is an environment in which the content is increasingly composed of Media Objects, such as Video, Audio and RSS. This content is frequently guarded behind AJAX and other schemes and is often not referenced by static URLs. As a result, most video available on the web cannot be independently accessed with a conventional Media Player.

Users wishing to view a Media Object on a web page employing AJAX or similar schemes must visit the web page with a Browser and watch while a Media Player runs in Dependent Operation of the browser, requiring the user to view the entire web page as well as the Media Object.

Additionally, if users were reliably able to run Media Objects in a ToolBar or Console it is reasonable to assume they would often wish to run more than one Media Object concurrently. For example, a user may wish to run several videos concurrently in a ToolBar. While some services exist that allow users to extract a portion of a web page and display the selected portion, these services are unable to independently control the sound produced by the Media Object isolated in the DOM, as the sound is attributed to the process ID of the browser. If a user were to start multiple Media Objects concurrently using a standard service capable of displaying an Object in the DOM, all of the Media Objects would emit sound simultaneously—rendering the process useless for Media Objects that produce sound.

Since current services that isolate Objects in the DOM are unable to usefully handle multiple Objects producing sound, such as video or Internet Radio or podcasts, the inability to control the sound produced by each individual Media Object would limit a ToolBar or Console application to a single sound emitting Media Object.

A significant proportion of the video and audio available on the Internet is found in the form of "clips" or short segments that play for a defined period of time. As a consequence, a user playing multiple videos concurrently will run into a logistical problem as video clips will constantly be ending, causing the user to have to attend to start another video.

While conventional Media Players can easily detect the end of a file when referencing a URL, the task of detecting the "end" of a video is not easy when the video is being played in Dependent Operation within an embedded Browser. A software program analyzing the DOM has no easy way to detect the "end of file", as there is no "video file" to examine.

Many Media Objects found on the Internet are displayed in a format where the Media Object does not run automatically upon the web page being loaded into memory. When a user visits a web page containing a Media Object hidden behind AJAX or similar schemes, the user must click on a graphic or perform a sequence of tasks to cause the Media Object to execute. A user running many Media Objects would be required to constantly start Media Objects by clicking on graphics.

The foregoing examples of the related art and limitations related thereto are intended to be illustrative and not exclusive. Other limitations of the related art will become apparent to those of skill in the art upon a reading of the specification and a study of the drawings.

SUMMARY

The following embodiments and aspects thereof are described and illustrated in conjunction with systems, tools and methods which are meant to be exemplary and illustrative, not limiting in scope. In various embodiments, one or more of the above-described problems have been reduced or eliminated, while other embodiments are directed to other improvements.

What is needed therefore is a system that allows a user to view specified Media Objects from the DOM's of multiple web pages.

A Media Viewer is therefore provided that allows the web pages containing the desired Media Objects to run within a background instance of a Web Browser and extracts the relevant Media Object from the DOM and displays the Media Object in a stand alone viewer.

More particularly, the invention provides a computer implemented method for a user provided with a computer to select and play media objects in the Document Object Model ("DOM") of a web page displayed on a user's computer, wherein each user's computer has a memory and a computer display able to provide a user interface and being accessible via the Internet to web pages containing the media objects using a web browser, a media player and user input means comprising a user pointing device for manipulating a displayed pointer, the method comprising:

- i) identifying each Media Object in the DOM rendered by the web browser for a displayed web page;
- ii) providing means to visually identify each Media Object in the DOM to the user;
- iii) the User selecting with the pointing device a Media Object to view;
- iv) assembling and storing in memory a Vector Record for the selected Media Object in the DOM, wherein the Vector Record contains:
  - a. the URLs associated with each selected Media Object in the DOM.
  - b. information about the location of the selected Media Object, selected from the group consisting of:
    - i. the URL of the surrounding web page on which the selected Media Object is found;
    - ii. the title of the selected Media Object;
    - iii. the ordinal position of the selected Media Object in source order as the selected Media Object appears in the DOM;
    - iv. the ID associated with the selected Media Object on the web page;
    - v. the file type of the selected Media Object;
    - vi. the tag name of the selected Media Object;
    - vii. the position of the pointer in the DOM during the selection step; and
    - viii. the most recent series of selection events prior to the selection step;
- v) retrieving the Vector Record for the selected Media Object and obtaining the URL for the web page and the location of the selected Media Object on the web page from the Vector Record;
- vi) opening a window or frame within which to display the selected Media Object;
- vii) starting a browser session as a background process;
- viii) loading the web page containing the selected Media Object into the background session of the browser using the URL obtained from the Vector Record;
- ix) navigating to the location of the selected Media Object on the web page loaded in the background browser using the information obtained from the Vector Record;
- x) scaling the selected Media Object to fit the window or frame; and
- xi) displaying the selected Media Object in said window or frame.

Preferably the means to visually identify each Media Object in the DOM to the user comprises a graphic element adapted to be displayed when the pointing element is sufficiently close to the Media Object.

According to further aspects of the invention, the Media Viewer is provided which can be used to display the media desired by the user in a toolbar or console, allowing the user to watch or listen to the Media Object and conduct other tasks. The Media Viewer may be capable of running multiple concurrent Media Objects within independent browser sessions, each possessing their own process ID.

According to further aspects of the invention, a Media Viewer is provided which is capable of displaying Media Objects that produce sound, allowing the Media Viewer to independently control the sound in each instance of the Viewer by means of a process that tracks and can alter the sound produced by each process ID.

According to further aspects of the invention, a Media Viewer is provided which is capable of playing videos in succession, so that a new clip can be automatically started when an old clip has stopped. The Media Viewer may have the ability to detect the movement and sound in a Media Object residing in the DOM to establish patterns of output which indicate the video has ended and a new video should be launched.

According to further aspects of the invention, a Media Viewer is provided which is capable of performing a pre-recorded set of instructions to cause Media Objects to run without user intervention.

The invention also provides a computer program product for carrying out the foregoing method. In addition to the exemplary aspects and embodiments described above, further aspects and embodiments will become apparent by reference to the drawings and by study of the following detailed descriptions.

BRIEF DESCRIPTION OF DRAWINGS

Exemplary embodiments are illustrated in referenced figures of the drawings. It is intended that the embodiments and figures disclosed herein are to be considered illustrative rather than restrictive.

In drawings which illustrate a preferred embodiment of the invention:

FIG. 1 is a flowchart illustrating the method of displaying a media object.

FIG. 2 is a flowchart illustrating the method of displaying a media object using pre-recorded instructions.

FIG. 3 is a flowchart illustrating the method of controlling the sound independently with multiple objects.

DESCRIPTION

Figure 4A:
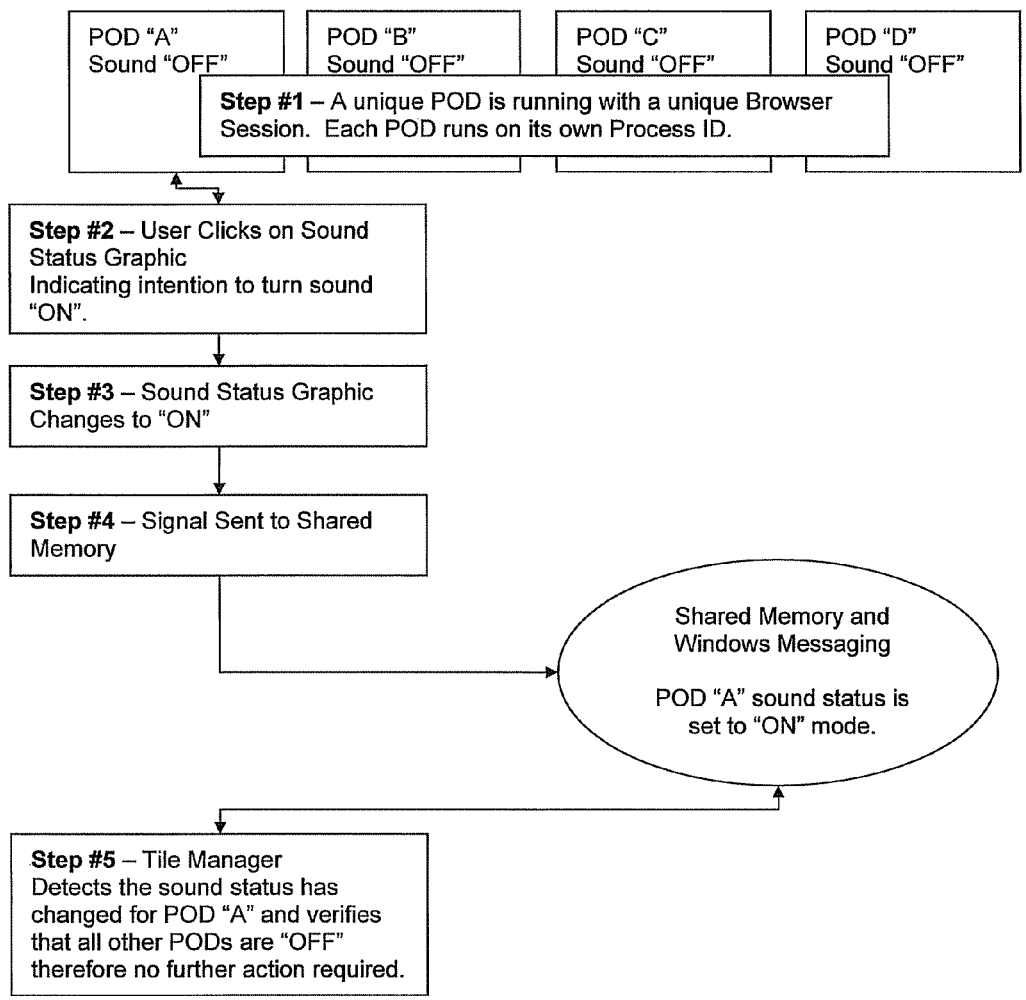
FIGS. 4a, 4b and 4c are flowcharts illustrating the method of controlling the sound independently with multiple objects.

Throughout the following description specific details are set forth in order to provide a more thorough understanding to persons skilled in the art. However, well known elements may not have been shown or described in detail to avoid unnecessarily obscuring the disclosure. Accordingly, the description and drawings are to be regarded in an illustrative, rather than a restrictive, sense.

A software system ("System") that allows a person ("User") to view multiple Media Objects ("Media Object") displayed in the Domain Object Model (DOM) of web pages within a toolbar or console.

A software system ("System") that allows a person ("User") to visit a web page and identify Videos, audio or RSS or other forms of content ("Media Objects") in the Document Object Model ("DOM") of a web page and capture identifying information about the location of Media Objects. The System is designed to allow the User to capture the location of the Media Objects in a format that is designed to allow users to have access to the Media Objects in the future even in cases where the URL is hidden behind AJAX (or similar schemes) or dynamically assigned by the content provider or requires a recently assigned cookie.

The System automatically places targets ("Target") on Media Objects in the DOM that can be seen and clicked on by the User. When a User clicks upon a Target, the System records the URL and other information about the location of the Media Object so that the location of the Media Object can be stored in a manner that permits the System to locate the Media Object and display the Media Object in a toolbar, console or third party website. The information regarding the location of the Media Object is stored as a series of observations about the Media Objects location (called herein a "Vector"). These observations may include:

a. The URL of the surrounding web page on which the Media Object is found (called the Vector URL).
b. The Title of the Object (called the Vector Title).
c. The ordinal position of the Media Object in source order as the Object appears in the DOM, e.g. if it was the 3$^{rd}$ Object encountered in the DOM (called the Vector Sequence Number).
d. The ID associated with the Media Object on the web page (called the Vector ID).
e. The File Type of the Media Object (called the Vector File Type).
f. The Tag Name of the Media Object (called the Vector Tag).
g. The position of the mouse in the DOM during the "mouse click event" (called Vector Mouse Position).
h. The most recent series of mouse clicks and key strokes used prior to the "mouse click event" (called Vector Series).

The System also permits the User to save metadata captured from the web page from which the media was sourced to provide subsequent users with a searchable index.

The User can also create lists of Media Objects (called "Media Lists") containing groups of Media Objects that are related based upon the User's preferences. The User can play the Media Lists or save the Media Lists and share them with other users.

The System is capable of playing multiple Media Objects concurrently, where each Media Object is displayed in its own frame (called a Tile) by means of a unique process running under a unique process ID (called a POD). The system is further equipped with the ability to independently control the sound being produced by each POD.

If the user wishes to display the Media Object in a ToolBar as described in U.S. patent application Ser. No. 12/210,202 entitled "SYSTEM FOR MANAGING MULTI-MEDIA CONTENT ACROSS MULTIPLE SOFTWARE APPLICATIONS", then the user installs and runs on his computer this Tile Manager software. As described in that patent application, the Tile Manager manages the intercommunication between POD's (e.g. when sound is turn ON in one POD, it is turned OFF in any POD previously playing sound). It also tells POD's where they should appear on the screen by arranging the Tiles produced by the POD's in the area called a "Place Holder".

The system is also capable of playing videos in succession, having the ability to recognize when a video clip has stopped running and start a new video.

The System is described in FIG. 1 and functions as follows:

Step 1—System locates a potential Media Object in the DOM utilizing the method described in U.S. patent application Ser. No. 12/210,202 entitled "SYSTEM FOR MANAGING MULTI-MEDIA CONTENT ACROSS MULTIPLE SOFTWARE APPLICATIONS".

Step 2—System places a Target image ("Play" button) on or near the potential Media Object.

Step 3—User selects the Media Object in the DOM by clicking on the Target image ("Pay" Button) indicating a desire to view the Media Object.

Step 4—System records the location of the Media Object by recording the Vector Data in a database. The data includes:
  a. The URL of the surrounding web page on which the Media Object is found (called the Vector URL).
  b. The Title of the Object (called the Vector Title).
  c. The ordinal position of the Media Object in source order as the Object appears in the DOM, e.g. if it was the 3$^{rd}$ Object encountered in the DOM (called the Vector Sequence Number).
  d. The ID associated with the Media Object on the web page (called the Vector ID).
  e. The File Type of the Media Object (called the Vector File Type).
  f. The Tag Name of the Media Object (called the Vector Tag).
  g. The position of the mouse in the DOM during the "mouse click event" (called Vector Mouse Position).
  h. The most recent series of mouse clicks and key strokes used prior to the "mouse click event" (called Vector Series).

Step 5—A software program called a POD executes and refers to the Vector Record for the Media Object and obtains the URL for the web page and the Location of the Object on the web page.

Step 6—The POD opens a window, called a "Tile", to display the Object.

Step 7—The POD starts a browser session as a background process.

Step 8—The POD loads the web page containing the Object into the background session of the browser (using the URL obtained from the Vector Record).

Step 9—The POD navigates to the location of the Object on the webpage loaded in the Background Browser using the Vector information.

Step 10—The POD scales the Object to fit the Tile.

Step 11—The POD displays the Object defined in the Vector Record in a rectangular frame (called a "Tile"). The Object is displayed in a Tile which can be displayed on a Place Holder as described in U.S. patent application Ser. No. 12/210,202.

Pseudo Code—Displaying Media Object

The following pseudo code outlines the method used in the current embodiment of the invention:

```
class MondoApp //
{
   MediaTileContainer mMediaTielContainer; // the container of media
   tiles void buttonViewObject_Click( )
   {
      // Get HTML Object referenced by "View Object Button"
      mshtml.IHTMLElement object = button.ReferencedObject;
      // Create new media object
      MondoMedia media = new MondoMedia( );
      media.MediaType = MondoMediaType.Web;
      // Obtain object's URL, ID, Location, other Vector Infomation
      media.URL = object.URL;
      media.VectorID = object.Id;
      media.VectorParent = object.Parent;
      media.VectorHTML = object.InnerHTML;
      LaunchWebBrowserTile(media);
   }
   void LaunchWebBrowserTile(MondMedia media)
   {
      // Start media tile using webBrowser
      MondoMediaTile webBrowserTile = new
      MondoMediaTileWebBrowser( );
      // Assign the media to newly created tile
      webBrowserTile.SetMedia(media);
      // Display the new media tile
      this.mMediaTileContainer.Add(mediaTile);
   }
}
class MondoMediaTileWebBrowser : MondoMediaTile
{
   WebBrowser mWebBrowser;
   MondoMedia mMedia = null;
   void SetMedia(MondoMedia media)
   {
      this.mMedia.Assign(media);
      PlayMedia( );
   }
   void PlayMedia( )
   {
      if (this.mMedia != null)
      {
         this.mWebBrowser.Navigate(media.URL);
         this.mWebBrowser.ScaleTo(media.VecotrID);
      }
   }
}
```

Displaying an Object Using Pre-Recorded Instructions

The System is described in FIG. 2 and functions as follows:

Step 1—A User clicks on a button indicating a desire to Play a specified Object.

Step 2—The POD refers to the Vector Record for the Object and obtains the URL for the web page and the Location of the Object on the web page.

Step 3—The POD opens a window, called a "Tile", to display the Object.

Step 4—The POD starts a browser session as a background process.

Step 5—The POD loads the web page containing the Object into the background session of the browser (using the URL obtained from the Vector Record).

Step 6—The POD navigates to the location of the Object on the webpage loaded in the Background Browser using the Vector information.

Step 7—The POD scales the Object to fit the Tile.

Step 8—The POD executes the Pre-Recorded Instructions to start the video playing.

Step 9—The POD displays the Object defined in the Vector Record in a rectangular frame (called a "Tile"). The Object is displayed in a Tile which can be displayed on a Place Holder as described in U.S. patent application Ser. No. 12/210,202 referenced above.

Pseudo Code—Displaying a Media Object Using Pre-Recorded Instructions

The following pseudo code outlines the method used in the current embodiment of the invention:

```
class MondoApp
{
   MediaTileContainer mMediaTielContainer; // the container of media tiles
   List<MondoWebInstruction> mCurrentInstructionList; // the list of recorded
instructions
   void buttonViewObject_Click( )
   {
      // Get HTML Object referenced by "View Object Button"
      mshtml.IHTMLElement object = button.ReferencedObject;
      // Create new media object
      MondoMedia media = new MondoMedia( );
      media.MediaType = MondoMediaType.Web;
      // Obtain object's URL, ID, Location, other Vector Infomation
      media.URL = object.URL;
      media.VectorID = object.Id;
      media.VectorParent = object.Parent;
      media.VectorHTML = object.InnerHTML;
      for (int I = 0; I < this.mCurrentInstructionList.Count; I++)
      {
media.InstructionList.Add(this.CurrentInstructionList.Instructions[i]);
      }
      LaunchWebBrowserTile(media);
   }
   void LaunchWebBrowserTile(MondMedia media)
   {
      // Start media tile using webBrowser
      MondoMediaTile webBrowserTile = new MondoMediaTile ( );
      // Assign the media to newly created tile
      webBrowserTile.SetMedia(media);
      // Display the new media tile
      this.mMediaTileContainer.Add(mediaTile);
   }
   void WebBrowser_MouseClick(mshtml.IHTMLElement object, int X, int Y,
MouseButton button)
```

```
    {
       // record the time stamp
       DateTime timeStamp = Now;
       MondoWebInstruction inst = new MondoWebInstruction( );
       inst.ControlType = MOUSE;
       inst.Location = new Point(X, Y);
       inst.Button = button;
       inst.ID = object.ID;
       inst.TimeStamp = Now - this.TimeDocumentCompleted;
       this.mCurrentInstructionList.Add(inst);
    }
    void WebBrowser_DocumentCompleted( )
    {
       ...
       // Clear the previous Instruction List.
       this.mCurrentInstructionList.Clear( );
       // Reset the time stamp for the new Instruction List
       this.TimeDocumentCompleted = Now;
    }
    void WebBrowser_MouseClick(mshtml.IHTMLElement object, int X, int Y,
MouseButton button)
    {
       // record the time stamp
       DateTime timeStamp = Now;
       MondoWebInstruction inst = new MondoWebInstruction( );
       inst.ControlType = MOUSE;
       inst.Location = new Point(X, Y);
       inst.Button = button;
       inst.ID = object.ID;
       inst.TimeStamp = Now - this.TimeDocumentCompleted;
       this.mCurrentInstructionList.Add(inst);
    }
}
class MondoMediaTile : UserControl
{
    SharedMemoryTile mSharedMemory;
    IntPtr mPodHwnd;
    // Handle custom messages
    override void WndProc(Message m)
    {
       case (m.Msg)
       {
          case MondoMessages.WM_MONDO_POD_CHILD:
             HandleChildEvent( );
             return;
       }
    }
    void SetMedia(MondoMedia media)
    {
       This.mSharedMemory = new ShareMemoryTile(this.Handle);
       this.mSharedMemory.SetMedia(media);
       this.mSharedMemory.SetPosition(this.Position);
       this.mSharedMemory.SetSize(this.Size);
       this.mSharedMemory.SetParentHandle(this.Handle);
       LaunchPodApp(this.mSharedMemory.ID);
    }
    void OnLocationChanged(object sender, EventArgs e)
    {
       //notify Pod about new location
       this.mSharedMemory.SetPosition(this.Position);
       SendMessage(this.mPodHwnd, WM_MONDO_POD_PARENT, this.Handle, 0);
    }
    void OnSizeChanged(object sender, EventArgs e)
    {
       //notify Pod about new location
       this.mSharedMemory.SetSize(this.Size);
       SendMessage(this.mPodHwnd, WM_MONDO_POD_PARENT, this.Handle, 0);
    }
}
class MondoMediaPod
{
    WebBrowser mWebBrowser;
    MondoMedia mMedia = null;
    Timer       mTimerExecute;
    SharedMemoryTile mSharedMemory;
    IntPtr      mParentHwnd;
    MondMediaTileWebBrowser(String ID)
    {
       // Constructor for MondoMediaTileWebBrowser
       mWebBrowser.OnDocumentCompleted += WebBrowser_DocumentCompleted;
```

```
      mTimerExecute.OnTick += TimerExecute_OnClick;
      // Establish SharedMemory for communicating with the parent tile
      mSharedMemory = new SharedMemoryTile(ID)
      SetMedia(mSharedMemoryTile.GetMedia( ));
      mParentHwnd = mSharedMemoryTile.GetParentHwnd( );
      SendMessage(this.mParentHwnd, WM_MONDO_POD_PARENT, this.Handle, 0);
   }
   // Handle custom messages
   override void WndProc(Message m)
   {
      case (m.Msg)
      {
         case MondoMessages.WM_MONDO_POD_PARENT:
            HandleParentEvent( );
            return;
      }
   }
   void HandleParentEvent( )
   {
      // Update POD position and size
      this.Location = mSharedMemory.GetLocation( );
      this.Size = mSharedMemory.GetSize( );
   }
   void SetMedia(MondoMedia media)
   {
      this.mMedia.Assign(media);
      PlayMedia( );
   }
   void PlayMedia( )
   {
      if (this.mMedia != null)
         this.mWebBrowser.Navigate(media.URL);
   }
   void WebBrowser_DocumentCompleted
   {
      if (this.mMedia != null)
      {
         this.mTimeDocumentCompleted = Now;
         if (this.mMedia.InstructionList.Count > 0)
         {
            this.mInstructionIndex = 0;
            this.mTimerExecute.Start( );
         }
         else
         {
            this.mWebBrowser.ScaleTo(media.VecotrID);
         }
      }
   }
   void TimerExecute_OnClick(object sender, Eventargs e)
   {
      if (this.mInstructionIndex < this.mMedia.InstructionList.Count)
      {
         TimeSpan gap = Now - this.mTimeDocumentCompleted;
         MondoWebInstruction inst =
this.mMedia.InstructionList[this.mInstructionIndex];
         if (gap > inst.TimeStamp)
         {
            ExecuteWebInstruction(inst);
            this.mInstructionIndex++;
         }
      }
      else
         this.TimerExecute.Stop( );
   }
}
```

Controlling the Sound Independently with Multiple Objects

Each POD displaying a Media Object may contain an object producing audio, such as a video with sound or an Internet radio station or a podcast. Conventionally each Object operates independently and emits sound concurrently causing a cacophony of sound if multiple sound emitting Objects are running.

Description of FIG. 3—Sound Control Architecture:

In FIG. 3, a signaling architecture is described by which the sound in each Tile or group of Tiles can be controlled by communicating with a Tile Manager.

Step 1—A User starts several Media Objects playing as described in FIG. 1. In the following example 4 Media Objects are launched called "A", "B", "C" and "D".

Step 2—Each Object results in a unique POD being executed. Each POD runs as separate process with its own Process ID and executes a unique browser session.

Step 3—Each POD generates a Tile (or window) displaying a Media Object. Tiles can appear in an array in a ToolBar or Console.

Step 4—Each POD is a slave to a process called a Tile Manager. The POD and Tile Manager communicate by means of Windows Messaging and shared memory as described in U.S. patent application Ser. No. 12/210,202 entitled "SYSTEM FOR MANAGING MULTI-MEDIA CONTENT ACROSS MULTIPLE SOFTWARE APPLICATIONS".

Pseudo Code—Sound Control Architecture

The following pseudo code outlines the method used in the current embodiment of the invention:

```
class MondoApp
{
    MediaTileContainer mMediaTielContainer; // the container of media
    tiles void HandleUnMute(MondoMediaTile tile)
    {
        for (int i = 0; i < this. mMediaTielContainer.Count; i++)
        {
            // Mute all the other tiles
            if (mMediaTileContainer[i] != tile)
            {
                MondoMediaTile otherTile = mMediaTileContainer[i];
                otherTile.MutePod( );
            }
        }
    }
}
class MondoMediaTile : UserControl
{
    SharedMemoryTile mSharedMemory;
    IntPtr mPodHwnd;
    Boolean mMuted;
    // Handle custom messages
    override void WndProc(Message m)
    {
        case (m.Msg)
        {
            case
            MondoMessages.WM_MONDO_POD_CHILD_UNMUTE:
                mMuted = false;
                MondoApp.HandleUnMute(this);
                return;
        }
    }
    void MutePod( )
    {
        if (mMute != true)
        {
            mMute = true;
            SendMessage(this.mPodHwnd,
                WM_MONDO_POD_PARENT_MUTE, 0, 0);
        }
    }
}
class MondoPodApp
{
    Boolean mMuted = true;
    void SetMuted(Boolean value)
    {
        this.mMuted = value;
        if (this.mMuted == false)
        {
            this.buttonSound.Image = sound_on_icon;
            // Notify the parent tile to mute other tiles
            SendMessage(this.mParentHwnd,
                WM_MONDO_POD_CHILD_UNMUTE, 0, 0);
        }
        else
            this.buttonSound.Image = sound_off_icon;
    }
    // Handle custom messages
    override void WndProc(Message m)
    {
        case (m.Msg)
        {
            case MondoMessages.WM_MONDO_POD_PARENT_MUTE:
                this.mMuted = true;
                return;
        }
    }
    void buttonSound_onClick(object sender, EventArgs e)
    {
        SetMuted(!this.mMuted);
    }
    void mondoPodMainForm_mouseover(sender object,
    MouseEventArgs e)
    {
        // Show the Sound Status Graphic
        buttonSound.Visible = true;
    }
    void mondoPodMainForm_mouseout(sender object,
    MouseEventArgs e)
    {
        // Hide the Sound Status Graphic
        buttonSound.Visible = false;
    }
}
```

Sound Control Signaling

Figure 4B:
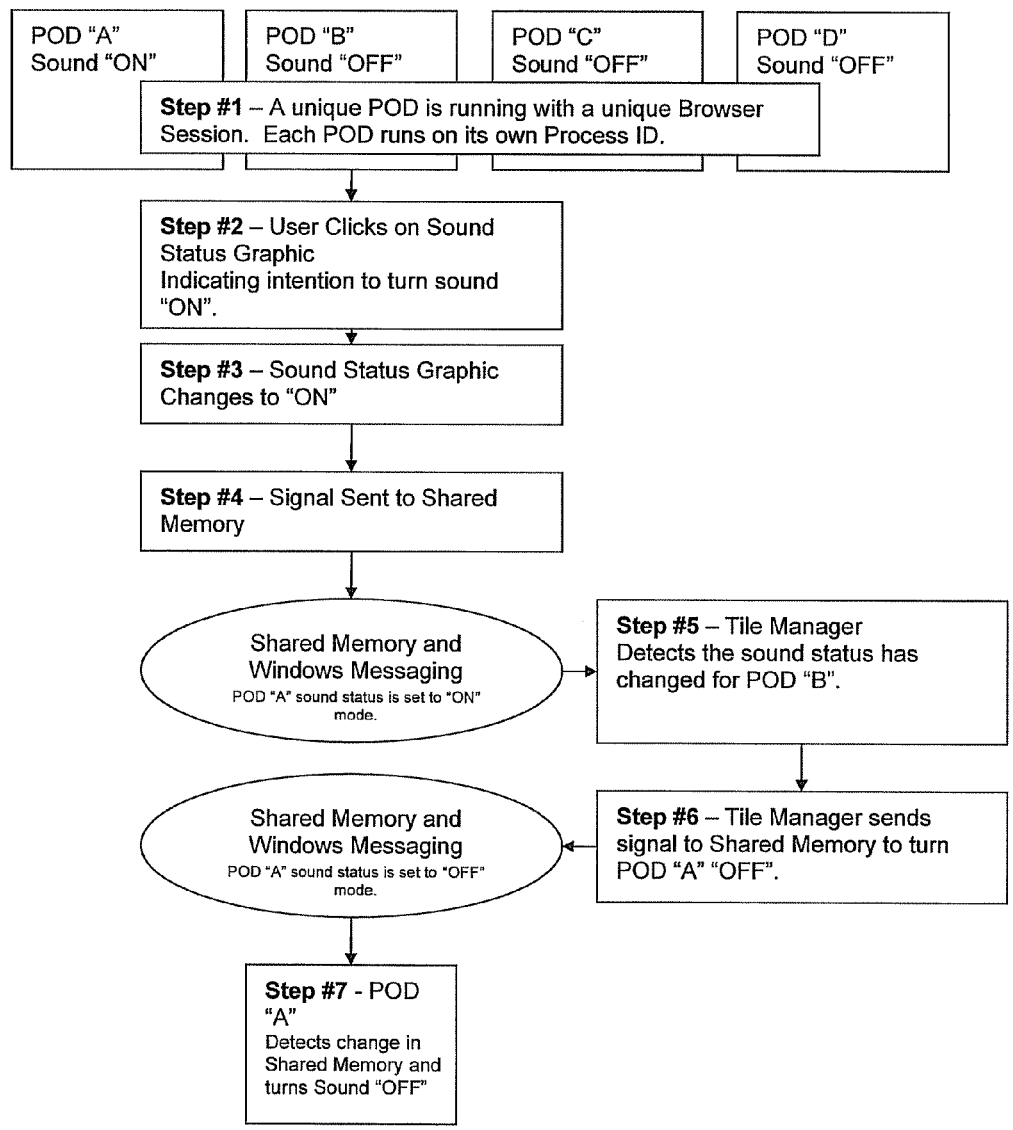
Figure 4C:
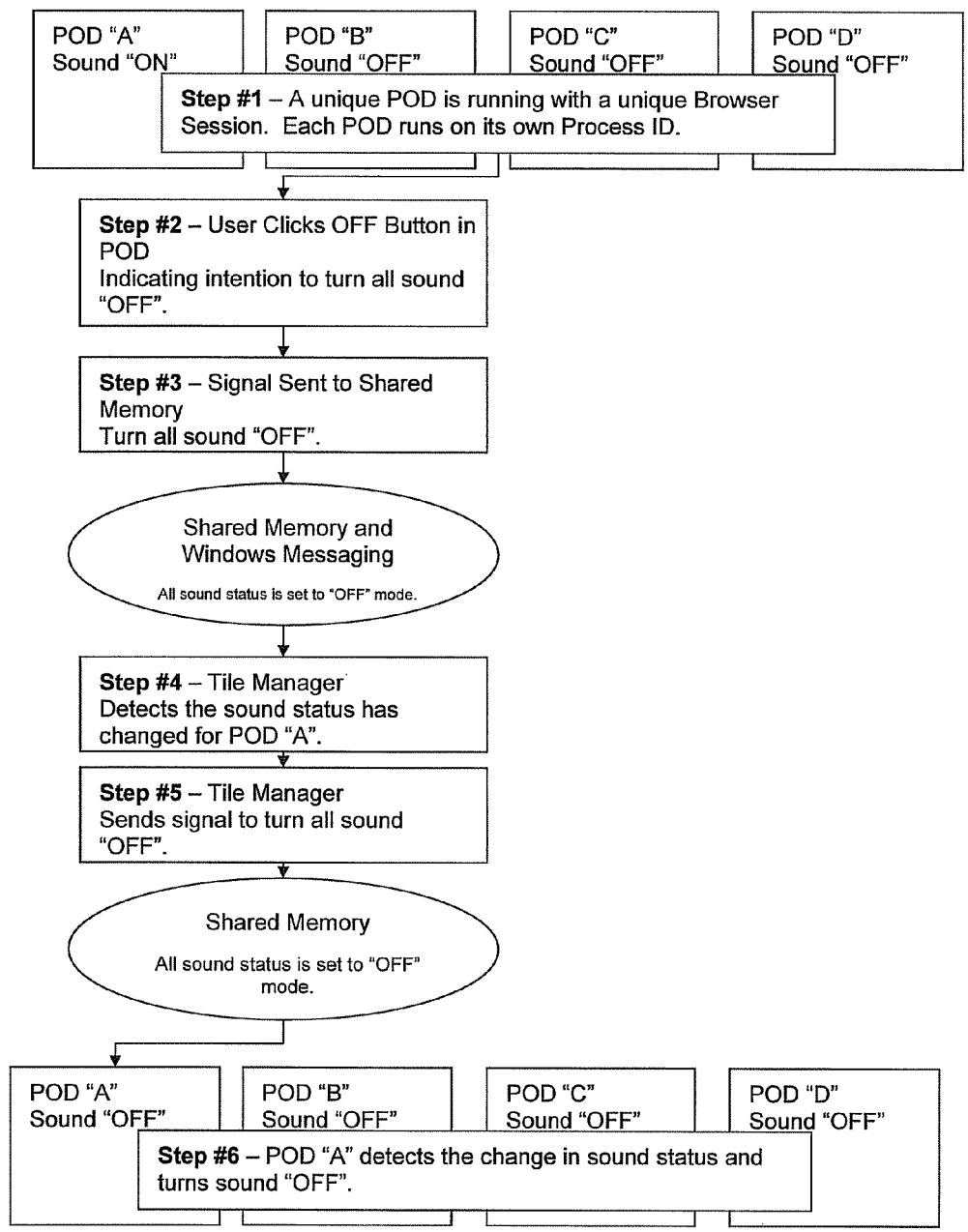

In FIGS. 4a, 4b and 4c, the process by which the POD and the Tile Manager communicate changes in the sound status of each POD is described.

Description of FIG. 4a:

Step 1—Several sound emitting Media Objects are running, each Media Object running in its own POD (for the purpose of this example 4 Media Objects are shown labeled A, B, C, D). A Sound Status Graphic displays on each object when the user mouses-over the POD. The graphic indicates whether the sound is ON or OFF in the given POD. In the example in FIG. 4a all of the POD's are in "sound off" mode at the beginning.

Step 2—The user mouses-over POD "A" and clicks on the Sound Status Graphic.

Step 3—The Sound Status Graphic in POD "A" changes to "sound ON" mode.

Step 4—A "sound ON" signal is sent using Windows Messaging Queue to the Tile Manager. The signal indicates the change in status for POD "A" from "sound OFF" to "sound ON" mode.

Step 5—The Tile Manager detects the change in status, but does not intervene—as there is only one POD emitting sound.

Description of FIG. 4b:

Step-1 Several sound emitting Media Objects are running, each Media Object running in its own POD (for the purpose of this example 4 Media Objects are shown labeled A, B, C, D). A Sound Status Graphic displays on each object when the user mouses-over the POD. The graphic indicates whether the sound is ON or OFF in the given POD. In the example in FIG. 4b POD "A" is in "sound ON" mode and PODs "B", "C" and "D" are in "sound off" mode at the beginning.

Step 2—The user mouses-over POD "B" and clicks on the Sound Status Graphic.

Step 3—The Sound Status Graphic in POD "B" changes to "sound ON" mode.

Step 4—A "sound ON" signal is sent using Windows Messaging Queue to the Tile Manager. The signal indicates the change in status for POD "B" from "sound OFF" to "sound ON" mode.

Step 5—The Tile Manager detects the change in status.

Step 6—The Tile Manager sends a signal via Windows Messenger to the Shared Memory to change the sound status of POD "A" from "sound ON" mode to "sound OFF" mode.

Step 7—POD "A" detects the change in status in the Shared Memory and turns its sound OFF.

Description of FIG. 4c:

Step-1 Several sound emitting. Media Objects are running, each Media Object running in its own POD (for the purpose of this example 4 Media Objects are shown labeled A, B, C, D). A Sound Status Graphic displays on each object when the user mouses-over the POD. The graphic indicates whether the sound is ON or OFF in the given POD. In the example in FIG. 4c POD "A" is in "sound ON" mode and PODs "B", "C" and "D" are in "sound off" mode at the beginning.

Step 2—The user mouses-over the OFF button in the POD and clicks on the OFF button.

Step 3—A "sound ON" signal is sent using Windows Messaging Queue to the Tile Manager. The signal indicates the change in status of the POD to "all sound OFF" mode.

Step 4—The Tile Manager detects the change in status.

Step 5—The Tile Manager sends a "sound OFF" signal via Windows Messaging Queue to the Tile Manager to change the sound status of any POD in "sound ON" mode to "sound OFF" mode (in this example POD "A" is turned OFF).

Step 6—POD "A" detects the change in status in the Shared Memory and turns its sound OFF.

Figure 5:
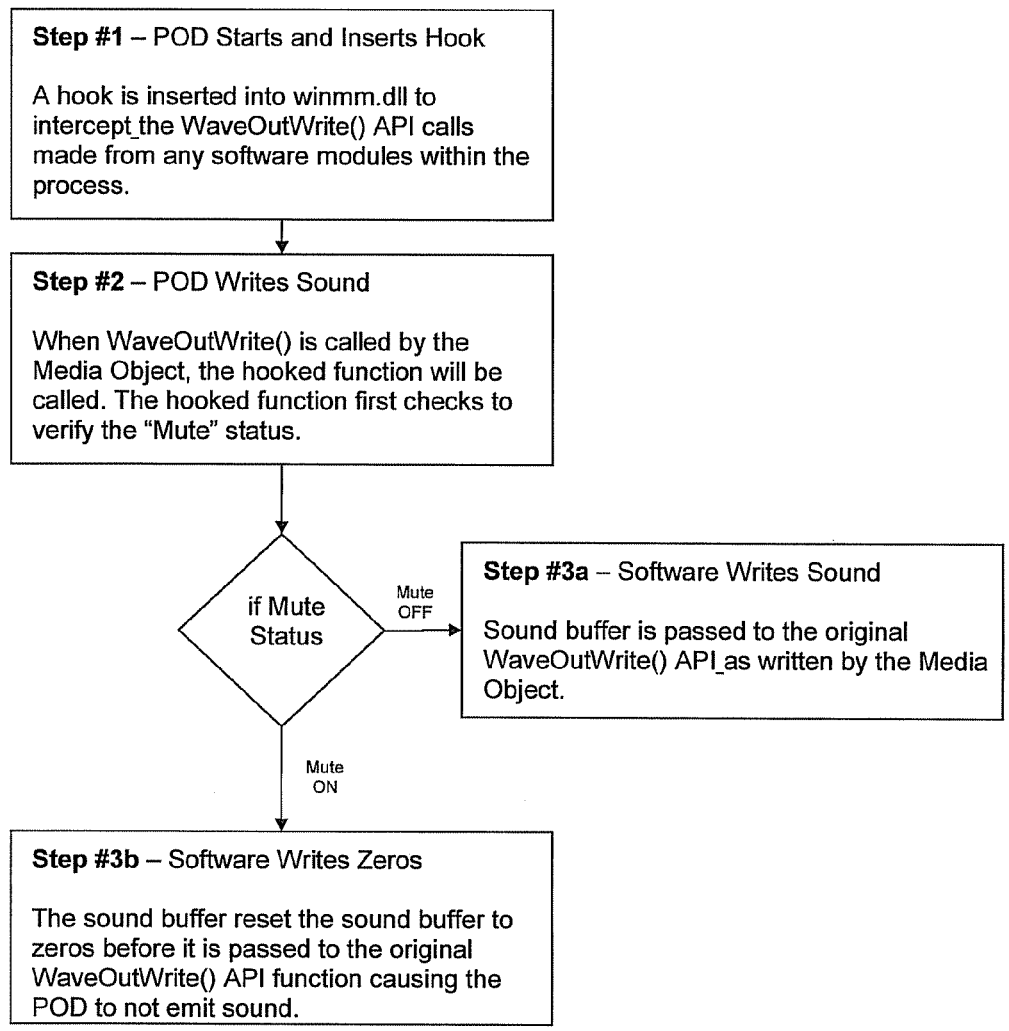
FIG. 5 is a flowchart illustrating the method of controlling the sound independently with multiple objects.

Description of FIG. 5—Method of Sound Control:

The sound produced by the computer is controlled by means of a process that runs within each POD.

WaveOutWrite dll is a "Dynamic Link Library" or API (Application Programmer Interface) provided by Microsoft on all Windows computers which allows applications to write sound to the operating system. This dll is called whenever any software on a Windows computer produces a sound. Each POD generates sound which is identified by a "Process ID". When sound records are written to the "WaveOutWrite" dll, each sound record contains the Process ID of the originating POD. Without a unique POD to spawn for each Object, there would be no way to turn off the sound for some Objects while allowing the sound from a given Object to be heard individually. Most ToolBar programs run as a single process and would be unable to support multiple videos running concurrently while permitting the sound from each video to be controlled individually. Without the POD's and a central process to control the POD's (the Tile Manager), the user would hear all of the videos playing sound at once.

Step 1—When a POD starts running, a "hook" is installed into the Windows buffer (called WaveOutWrite). This "hook" causes the POD to call the software to execute rather than the WaveOutWrite dll.

Step 2—Any time the POD writes sound to the WaveOutWrite buffer, the software checks to see if the POD is in mute (or "Sound OFF") status.

Step 3—If the POD is in mute (or "Sound OFF") status, the software writes zeros to the WaveOutWrite buffer. If the POD is not in mute (or "Sound ON") status, the software passes the values written by the Media Object to the WaveOutWrite buffer.

This process would not be possible if the PODs were running under one browser session with the same Process ID, as there would be no way to easily distinguish the source of the individual sounds coming from each Media Object.

Pseudo Code—Method of Sound Control Signaling:

The following pseudo code outlines the method used in the current embodiment of the invention:

```
class MondoPodApp
{
    Boolean mMuted;
    IntPtr mWaveOutWrite_Orig;
    LocalHook mWaveOutWriteHook = null;
    void MondoPodAppMainForm_onLoad( )
    {
        // inject our code into Windows API
        InstallHook( );
    }
    void MondoPodAppMainForm_onClose( )
    {
        // remove the hook
        UninstallHook( );
    }
    public override Boolean InstallHook( )
    {
        Boolean result = false;
        mWaveOutWrite_Orig = LocalHook.GetProcAddress("winmm.dll", "waveOutWrite");
        if (mWaveOutWrite_Orig != IntPtr.Zero)
        {
            mWaveOutWriteHook = LocalHook.Create(
                        mWaveOutWrite_Orig,
                        new DWaveOutWrite(WaveOutWrite_Hooked),
                        1);
            result = true;
        }
        return result;
    }
    public override Boolean UnInstallHook( )
    {
        if (null != mWaveOutWriteHook)
        {
            mWaveOutWriteHook.Dispose( );
            mWaveOutWriteHook = null;
            mWaveOutWrite_Orig = IntPtr.Zero;
        }
        return true;
    }
    // this is where we are intercepting all file accesses!
    int WaveOutWrite_Hooked(
            int hWaveOut,
            ref WaveHdr lpWaveOutHdr,
            uint uSize)
    {
        if (mMuted)
        {
            // Zeros the output buffer
            MemoryZero(lpWaveOutHdr.lpData,
            lpWaveOutHdr.dwBufferLength);
        }
        // call original API...
        return waveOutWrite(
            hWaveOut,
            ref lpWaveOutHdr,
            uSize);
    }
}
```

Playing or Saving a Media Object

Figure 6:
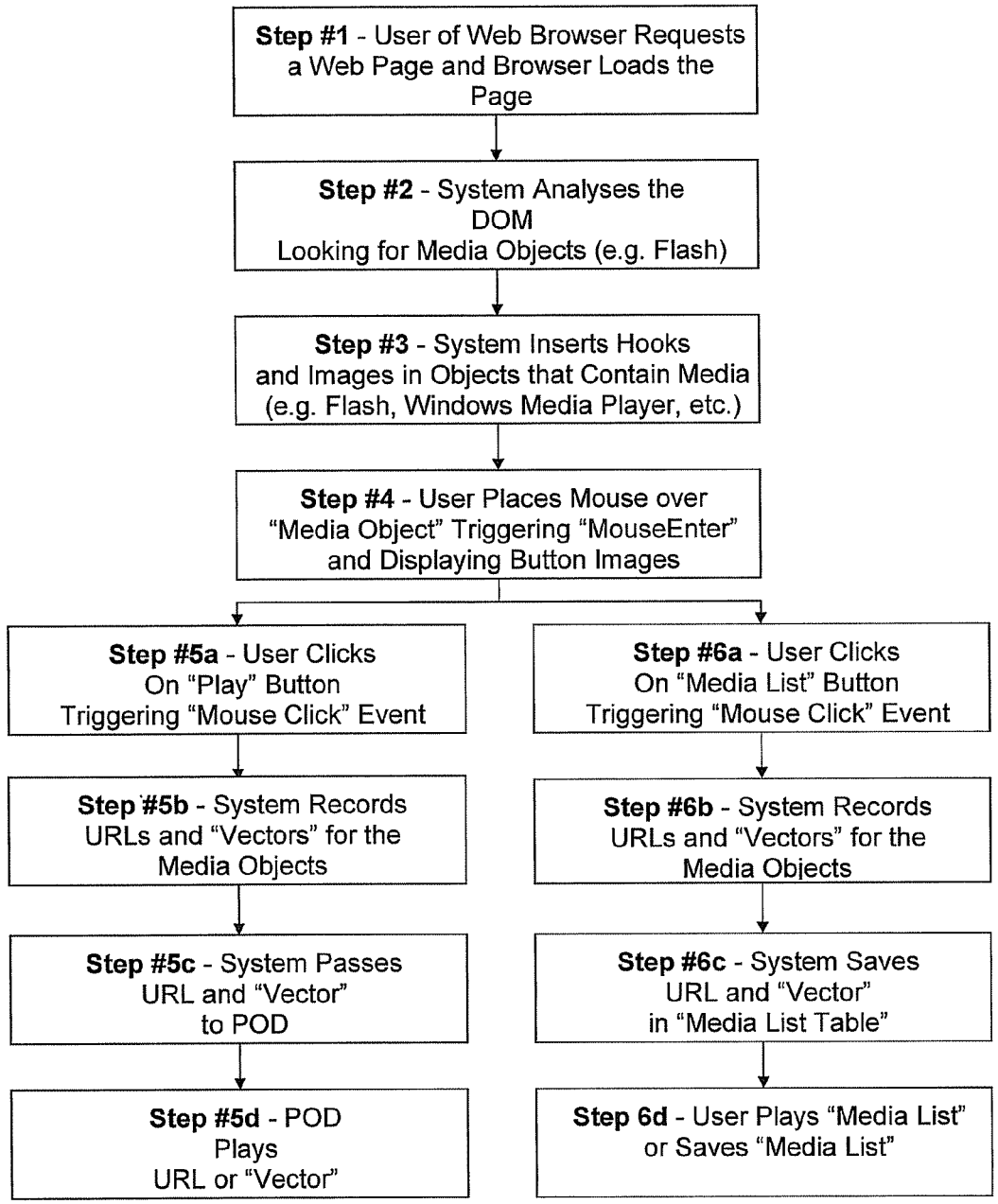
FIG. 6 is a flowchart illustrating the method of saving a media object.

A second embodiment of the process of obtaining or Saving a Media Object is described in FIG. 6 and functions as follows:

Step 1—The User equipped with a Client Computer running a copy of the System visits a web page using a standard browser such as Internet Explorer or Firefox.

Step 2—The System automatically analyses the Document Object Model ("DOM") looking for objects that could potentially contain "Media Objects", such as Flash content or Windows Media Files.

Step 3—The System automatically inserts software referred to in this invention as "Hooks" and "Images" around each Media Object in a "div" that enables the system to display Targets (a "Play" button and a "Media List" button) to the User when the User places the computer mouse over the Media Object in the DOM. Additionally, the software inserted into the DOM allows the System to record instances where the User clicks on the "Play" or "Media List" button on a specific Media Object.

Step 4—If the User places the computer mouse over a Media Object that has been identified by the System in step #4, the system detects the ("Mouse Enter Event") and displays the "Play" and "Media List" button images.

Step 5—If the User clicks on the "Play" button the system performs the following steps:

a. Records a "Mouse Click Event" and retrieves the URL and "Vector" information associated with the specific Media Object.

b. The System automatically records URL and other information pertaining to the Media Object ("Vector") which is described in more detail in the section entitled "Recording Media URLs and Vectors in the DOM".

c. Passes the URL and Vector to the POD.

d. The POD plays the media contained within the Media Object.

Step 6—If the User clicks on the "Media List" button the system performs the following steps:

a. Records the "Mouse Click Event" and retrieves the URL and "Vector" information associated with the specific Media Object.

b. The System automatically records URL and other information pertaining to the Media Object ("Vector") which is described in more detail in the section entitled "Recording Media URLs and Vectors in the DOM".

c. Saves the URL and Vector to a table in the Client Computer's memory called a "Media List Table".

d. Provides the User with the option of saving the Media List or Playing the entire list in the Media Player in succession.

Recording Media URLs and "Vectors" in the DOM

In the current embodiment of the invention, the software is embedded in the "User's" browser software. (See FIG. 7) When a "User" visits a web site using a conventional Web Browser, such as Internet Explorer or Firefox, the "System" automatically detects and records the Media Objects in the "DOM".

Figure 7:
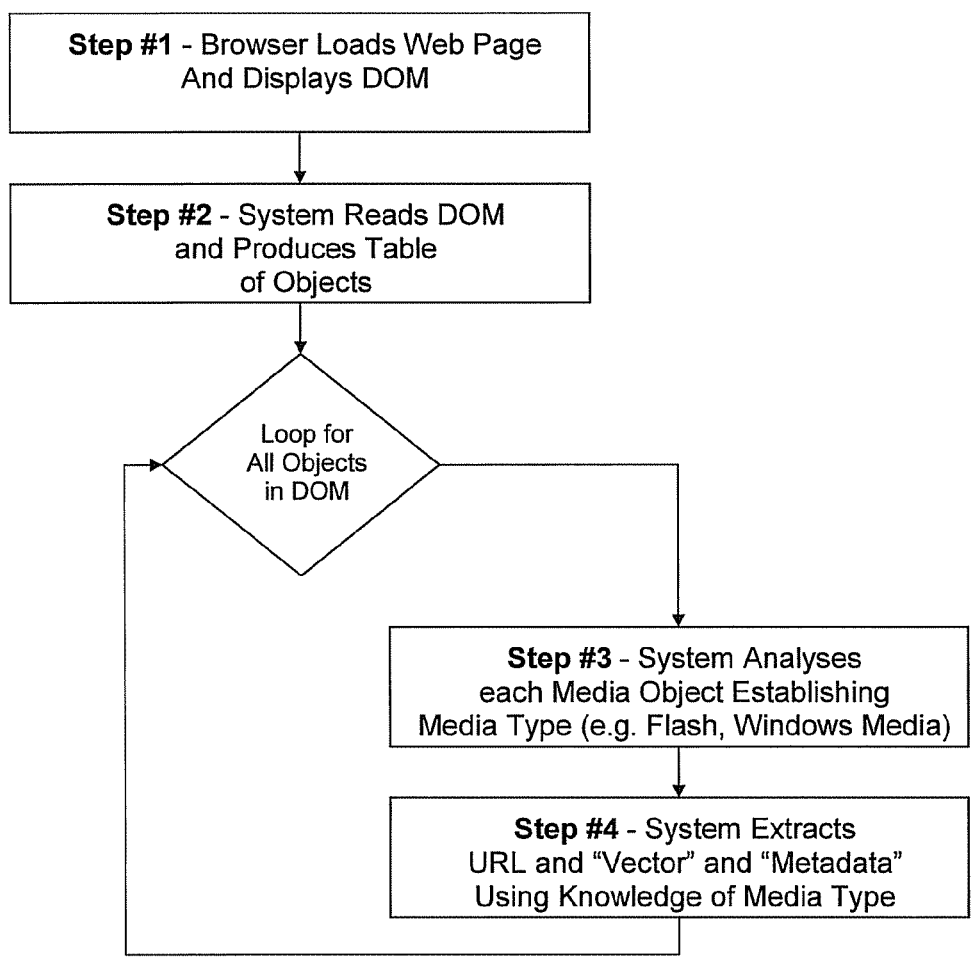
FIG. 7 is a flowchart illustrating the method of recording URLs and Vectors.

The System is described in FIG. 7 and functions as follows:

Step 1—The User's browser loads a web page and displays the DOM.

Step 2—The System reads the DOM and produces a table of "Objects" which may contain media or other desirable content.

Step 3—The System analyses each Object establishing whether the Object contains content of a specific type such as Flash or Windows Media Files.

Step 4—The System extracts the URL and Vector and Metadata using knowledge of the media type.

Pseudo Code—Recording URLs and Vectors

The following pseudo code outlines the method used in the current embodiment of the invention:

```
function OnDocumentComplete
{
    HTMLObjectElementCollection =
HTMLDocument.getElementsByTagName("OBJECT");
    foreach (HTMLObjectElement in HTMLObjectElementCollection)
    {
        if (HTMLObjectElement.classid ==
MacroMediaFlashObject.classid)
        {
            mediaObjectFound = true;
        }
        else if (HTMLObjectElement.classid == WMPlayer.classid)
        {
            mediaObjectFound = true;
        }
        else if (IsEmbeddedFlashObject(HTMLObjectElement))
        {
            mediaObjectFound = true;
        }
        else if (IsEmbeddedWMPlayerObject(HTMLObjectElement))
        {
            mediaObjectFound = true;
        }
        if (mediaObjectFound)
        {
            AddHooksForMediaObject(HTMLObjectElement,
              mediaURL);
        }
    }
}
```

Insert Hooks and Images in Media Objects in DOM

When the System detects a Media Object in the DOM, it inserts software components designed to allow the system to detect the User's intention to play a Media Object or to add the Media Object to a Media List. (See FIG. 8)

Figure 8:
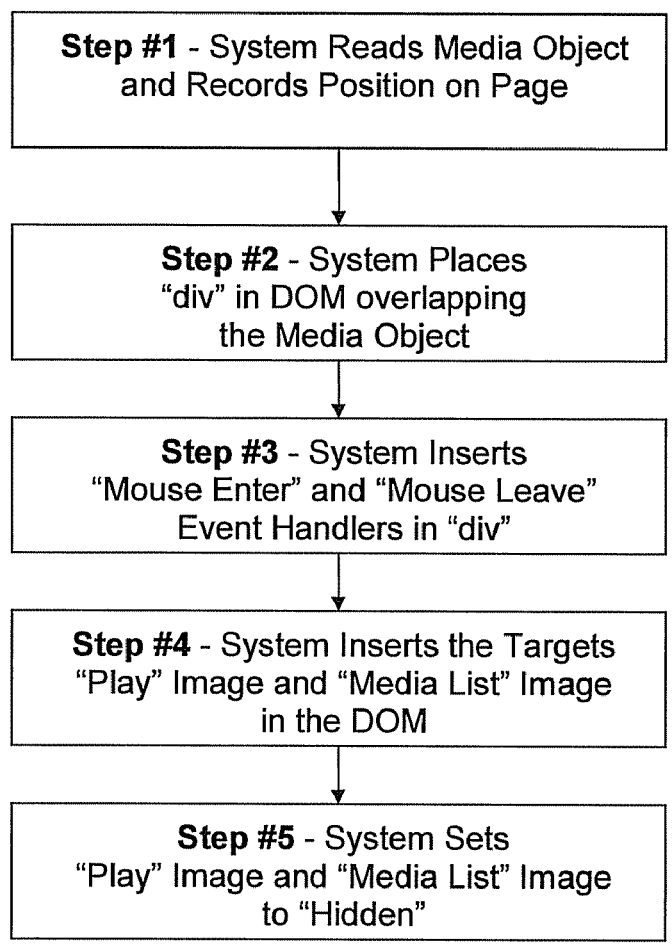
FIG. 8 is a flowchart illustrating the method of inserting hooks and images in media objects in DOM.

The System is described in FIG. 8 and functions as follows:

Step 1—The System reads the Media Object and records its position on the page.

Step 2—The System places a "div" as an "overlapping element" around the Media Object.

Step 3—The System inserts a "Mouse Enter" and "Mouse Leave" event handler in the "div" for each Media Object.

Step 4—The System inserts a "Play" Target and "Media List" Target image in the "div" for each Media Object.

Step 5—The System sets the Target images to a status of "Hidden" until the "div" is "entered" by a "Mouse Enter Event" (an instance where the user places the mouse over the Media Object).

Pseudo Code—Insert Hooks and Images

The following pseudo code outlines the method used in the current embodiment of the invention.

```
function AddHooksForMediaObject(HTMLObjectElement elem)
{
    // Make sure the newly created div and frame has higher zIndex
than the body element
    int baseZIndex = this.HTMLDocument.body.style.zIndex;
    // create new iframe shime over the div for imagePlay
    mshtml.HTMLIFrameClass framePlay =
this.HTMLDocument.createElement("iframe"));
    framePlay.style.zIndex = baseZIndex + 890;
    this.HTMLDocument.body.appendChild(framePlay);
    imagePlay = this.HTMLDocument.createElement("img");
    imagePlay.id = elem.id + "-play";
    imagePlay.className = "MondoControlPlayer";
```

-continued

```
        imagePlay.attribute["mediaRef"] = elem.id;
        framePlay.appendChild(imagePlay);
        // create new iframe shime over the div for imageMediaList
        mshtml.HTMLIFrameClass frameList =
this.HTMLDocument.createElement("iframe"));
        frameList.style.zIndex = baseZIndex + 890;
        this.HTMLDocument.body.appendChild(frameList);
        imageMediaList = this.HTMLDocument.createElement("img");
        imageMediaList.id = elem.id + "-media-list";
        imageMediaList.className = "MediaList";
        imageMediaList.attribute["mediaRef"] = elem.id;
        frameList.appendChild(imageMediaList);
        // Set the position of image related to the media object
        Set the position of framePlay at the top of HTMLObjectElement;
        Set the position of frameList at the top to HTMLObjectElement;
        // Set the event handlers
        imagePlay.onclick += Play__OnClick;
        imageMediaList.onclick += MediaList__OnClick;
        // set the initial visibility to hidden
        framePlay.style.visibility = "hidden";
        frameList.style.visibility = "hidden";
        divMediaObject = this.HTMLDocument.createElement("div");
        divMediaObject.id = elem.id + "-mondo-div";
        divMediaObject.attribute["MediaRef"] = elem.id;
        divMediaObject.style.zIndex = baseZIndex + 970;
        Set the position of divMediaObject at the top of
HTMLObjectElement;
        divMediaObject.onMouseEnter += Media__MouseEnter;
        divMediaObject.onMouseOver += Media__MouseEnter;
        divMediaObject.onMouseLeave += Media__MouseLeave;
        divMediaObject.onMouseOut += Media__MouseLeave;
        this.HTMLDocument.appendChild(divMediaObject);
    }
```

Mouse Over and Play or Save

The System is designed to allow the User to select media objects that can be "Played" or saved in a Media List. (See FIG. 9) In the current embodiment of the invention, when a User wishes to select a Media Object to be played or saved, the User can move the computer "mouse over" the object.

When the mouse enters the "div" surrounding the Media Object, two Target images appear containing a "Play" and a "Media List" button. If the user clicks on the "Play" or "Media List" button, the System records the "click event" and using knowledge of the type of the Object the system extracts the URL and "Vector" information from the Object. The following information is obtained:

a. The URLs associated with each Media Object in the DOM.
b. Information about the location of the Media Object, which may include:
  i. The URL of the surrounding web page on which the Media Object is found (called the Vector URL).
  ii. The Title of the Object (called the Vector Title).
  iii. The ordinal position of the Media Object in source order as the Object appears in the DOM, e.g. if it was the $3^{rd}$ Object encountered in the DOM (called the Vector Sequence Number).
  iv. The ID associated with the Media Object on the web page (called the Vector ID).
  v. The File Type of the Media Object (called the Vector File Type).
  vi. The Tag Name of the Media Object (called the Vector Tag).
  vii. The position of the mouse in the DOM during the "mouse click event" (called Vector Mouse Position).
  viii. The most recent series of mouse clicks and key strokes used prior to the "mouse click event" (called Vector Series).
  [This information about the Media Object is referred to in this invention as the Vector.]
c. The content on the surrounding web page that may be used for identifying the nature of the Media Object and indexing the content for future retrieval, called the Metadata for the purposes of this invention.

Figure 9:
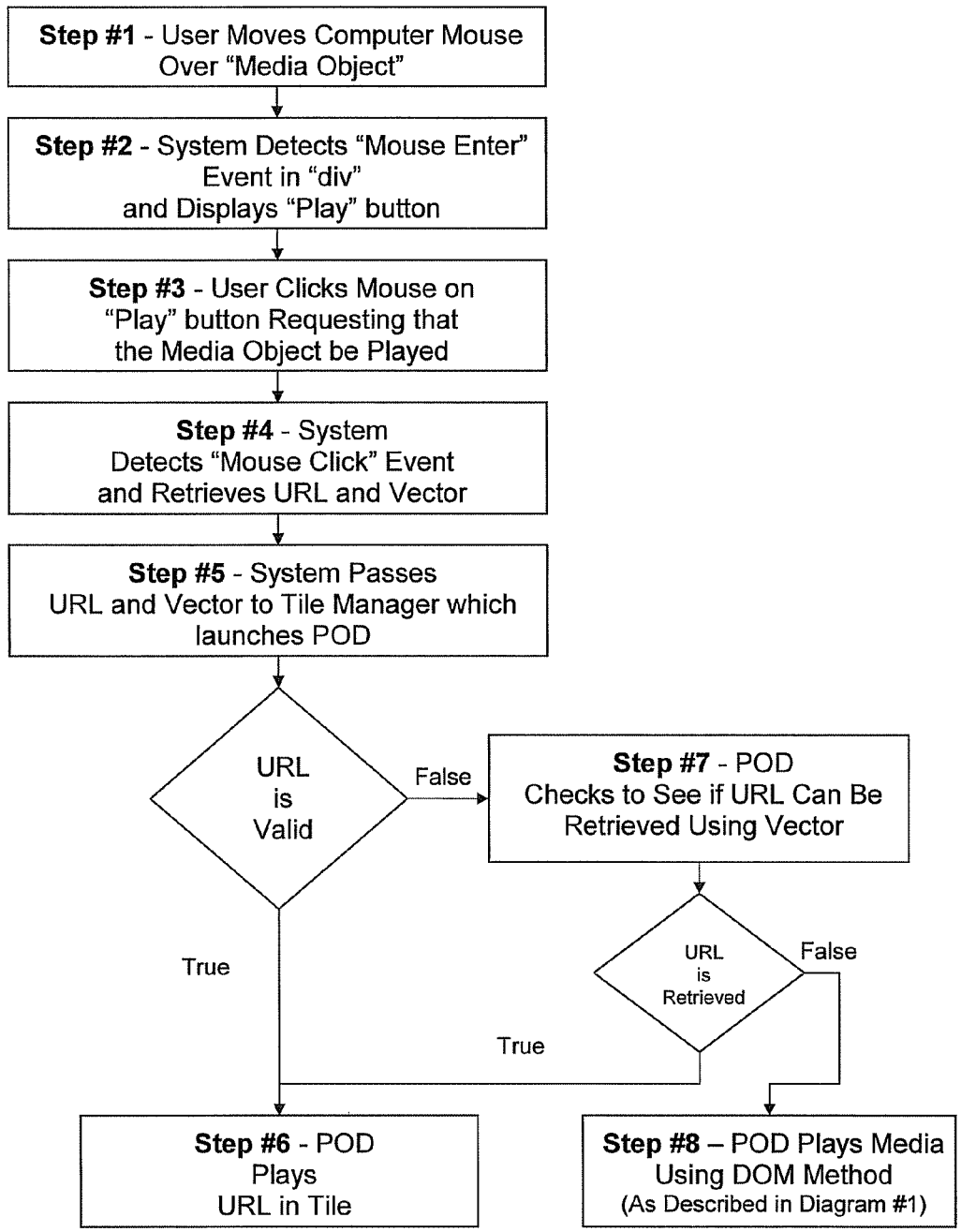
FIG. 9 is a flowchart illustrating the method of selecting media objects to play or save.

FIG. 9—Playing Media Object

In the current embodiment of the invention, the Media Player can play the Media Object in two viewing formats:
  1. In a viewing area embedded in the "ToolBar" area of the Browser called a "Tile".
  2. In a viewing area ("Tile") embedded in a stand-alone software program called a "Console".

Further description of the "ToolBar" and of "Tiles" can be found in U.S. patent application Ser. No. 12/210,202 entitled "SYSTEM FOR MANAGING MULTI-MEDIA CONTENT ACROSS MULTIPLE SOFTWARE APPLICATIONS" which is incorporated herein by reference.

The System is described in FIG. 9 and functions as follows:
Step 1—User moves mouse over a Media Object.
Step 2—System detects the mouse entering the area of the "div" surrounding the Media Object and displays the "Play" button.
Step 3—User clicks mouse over the "Play" button (as indicated in the section entitled "Mouse Over and Click Event").
Step 4—System detects the Mouse Click Event and retrieves the URL and Vector of the Media Object.
Step 5—System passes the URL and Vector to the Tile Manager.
Step 6—Tile Manager launches Pod to play the Media Object using URL.
Step 7—If the URL is invalid, due to an expired cookie or due to a broken link, the POD retrieves the URL (see section entitled "Regenerating URL Using Vector Information").
Step 8—If the URL cannot be retrieved by means of the Vector information, the Pod launches a web browser session in background to play the Media Object (as described in FIG. 1).

Figure 10:
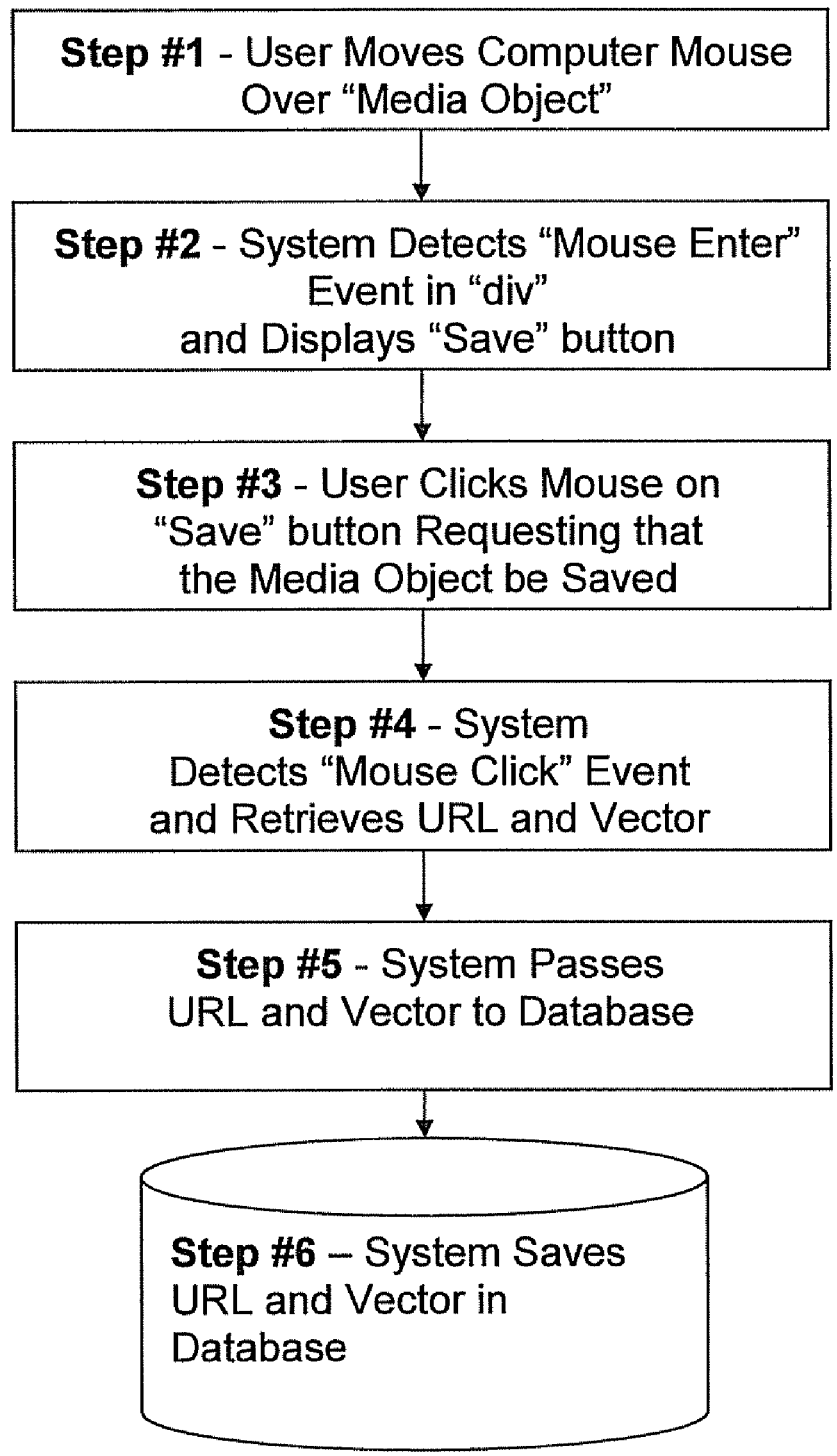
FIG. 10 is a flowchart illustrating the method of saving a media object.

FIG. 10—Saving Media Object

In the current embodiment of the invention, the Media Player can play the Media Object in two viewing formats:
1. In a viewing area embedded in the "ToolBar" area of the Browser called a "Tile".
2. In a viewing area ("Tile") embedded in a stand-alone software program called a "Console".

Further description of the "ToolBar" and of "Tiles" can be found in U.S. patent application Ser. No. 12/210,202 entitled "SYSTEM FOR MANAGING MULTI-MEDIA CONTENT ACROSS MULTIPLE SOFTWARE APPLICATIONS" which is incorporated herein by reference.

The System is described in FIG. 10 and functions as follows:
Step 1—User moves mouse over a Media Object.
Step 2—System detects the mouse entering the area of the "div" surrounding the Media Object and displays the "Save" button.
Step 3—User clicks mouse over the "Save" button (as indicated in the section entitled "Mouse Over and Click Event").
Step 4—System detects the Mouse Click Event and retrieves the URL and Vector of the Media Object.
Step 5—System passes the URL and Vector to the Database.
Step 6—System saves the URL and Vector information in the Database.

Pseudo Code—Mouse Over and Click Event (Play and Save)

The following pseudo code outlines the method used in the current embodiment of the invention:

```
function Media_MouseEnter
{
    sourceElement = element which trigger the mouse event
    if sourceElement is mshtml.IHTMLDivElement)
    {
        String obj_id =
(String)sourceElement.getAttribute("mediaRef", 0);
        imagePlay =
this.HTMLDocument.getElementById(obj_id + "- play");
        if (imagePlay != null)
            imagePlay.style.visibility = "visible";
        imageMediaList =
this.HTMLDocument.getElementById(obj_id + "- media-list");
        if (imageMediaList != null)
            imageMediaList.style.visibility = "visible";
    }
}
function Media_MouseLeave
{
    sourceElement = element which trigger the mouse event
    if sourceElement is mshtml.IHTMLDivElement)
    {
        if (mouse cursor position is outside the sourceElement area)
        {
            String obj_id =
(String)sourceElement.getAttribute("mediaRef", 0);
            imagePlay =
this.HTMLDocument.getElementById(obj_id + "- play");
            if (imagePlay != null)
                imagePlay.style.visibility = "hidden";
            imageMediaList =
this.HTMLDocument.getElementById(obj_id + "-media-list");
            if (imageMediaList != null)
                imageMediaList.style.visibility = "hidden";
        }
    }
}
function Play_OnClick
{
    sourceElement = element which trigger the mouse event;
    String obj_id = (String)sourceElement.getAttribute("mediaRef",
0);
    media_object = this.HTMLDocument.getElementById(obj_id);
    if (media_object != null)
    {
        mediaVector = RetrieveMediaVectorInfo(mediia_object as
HTMLObjectElement);
        // available vector information
        // HTMLObjectElement.id
        // HTMLObjectElement.sourceIndex
        // HTMLObjectElement.Style structure
        // HTMLObjectElement.Parent.Id
        // HTMLObjectElement.title
        hwndTileManager = GetMondoTileManagerHandler;
        SendMessage(hwndTileManager,
WM_MONDO_SELECT_MEDIA_PLAY, mediaVector);
    }
}
function PlayList_OnClick
{
    sourceElement = element which trigger the mouse event;
    String obj_id = (String)sourceElement.getAttribute("mediaRef",
0);
    media_object = this.HTMLDocument.getElementById(obj_id);
    if (media_object != null)
    {
        mediaVector = RetrieveMediaVectorInfo(mediia_object as
HTMLObjectElement);
        // available vector information
        // HTMLObjectElement.id
        // HTMLObjectElement.sourceIndex
        // HTMLObjectElement.Style structure
        // HTMLObjectElement.Parent.Id
        // HTMLObjectElement.title
        hwndTileManager = GetMondoTileManagerHandler;
        SendMessage(hwndTileManager,
WM_MONDO_SELECT_MEDIA_SAVE, mediaVector);
    }
}
```

Media Player Using URL or Vector Information

When the Media Player plays a Media Object, the URL and Vector are passed to the Media Player. The Media Player is equipped with the ability to play the Media Object using the following two step method:

1. Using the URL provided by the System, the Media Player can play the Media Object. In cases where the URL has not changed or the web site hosting the URL does not require a valid cookie, the URL will be the preferred method.
2. In cases where the URL was dynamically assigned by the content provider or has been changed by the content provider or requires a valid or recently assigned cookie or in cases where the URL method of playing the Media Object does not work, the System will use the Vector information to dynamically generate a URL for the Media Object. The Media Player will visit the URL of the web page containing the Media Object, locate the Media Object in the DOM using the ID, Title and Sequence Number and simulate a "Click Event" to dynamically generate a current and valid URL for the Media Object.
3. In cases where the URL cannot be obtained by means of the Vector information, the Media Object is played using the method described in FIG. 1.

Figure 11:
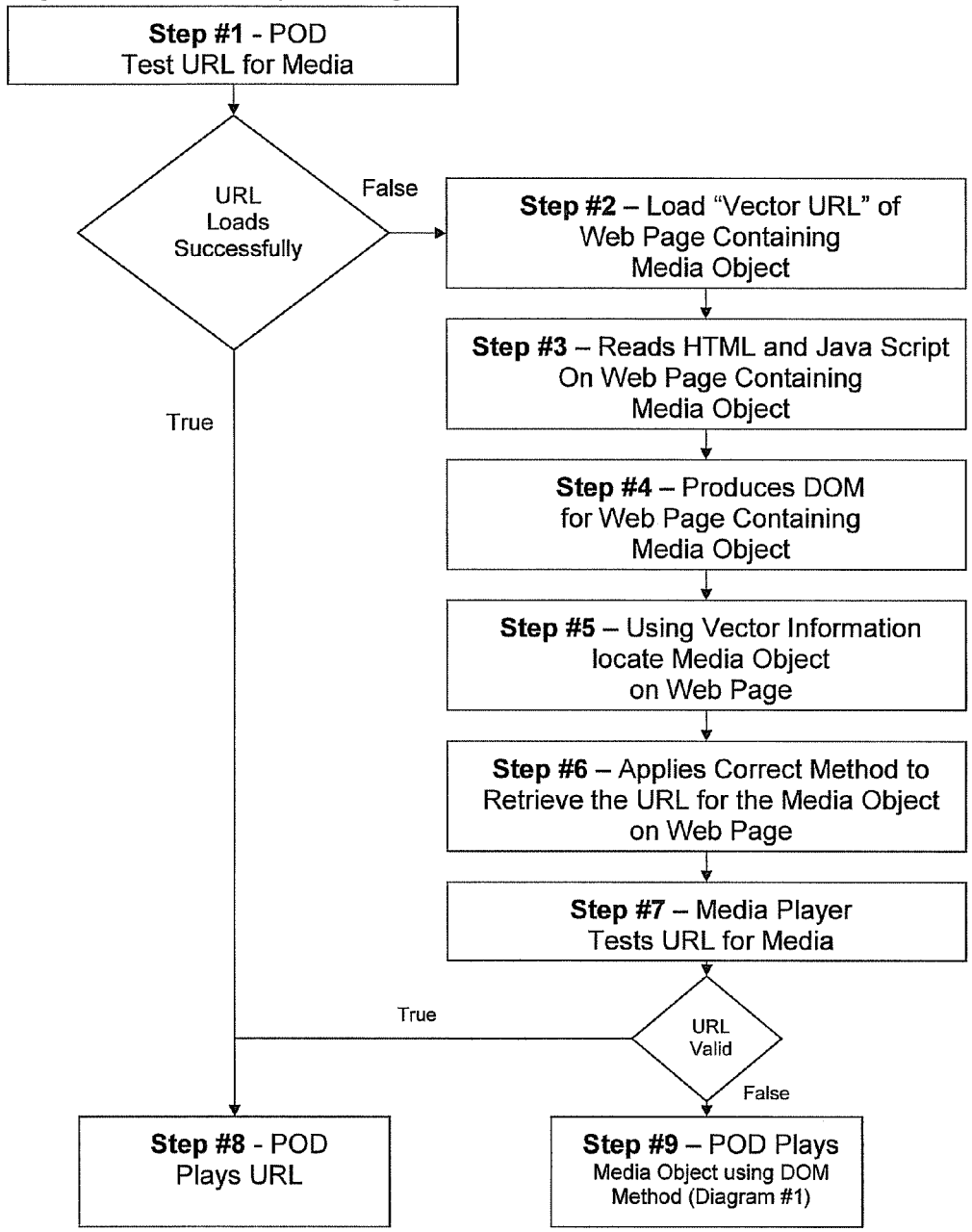
FIG. 11 is a flowchart illustrating the method of playing a media object using URL or Vector information.

In the current embodiment of the invention the process works as follows (described in FIG. 11):

Step 1—The Web Browser within Pod attempts to reach URL to play the Media. If the URL is valid, the process jumps directly to Step #8.

Step 2—If the URL for the Media fails to load the Media, such as a "404 HTML Error" or an "Address Not Found" or another error produced by the website hosting the Media, the System loads the "Vector URL" (the URL of the web page that originally contained the Media Object).

Step 3—The System reads the HTML and Java Script on the web page specified in the Vector URL.

Step 4—The System produces the DOM for the web page containing the Media Object.

Step 5—Using the other data found in the Vector, the System locates the Media Object in the DOM. The data used may include the Vector Title, the Vector ID and the Vector Sequence Number to locate the Object most likely to contain the desired Media on the page.

Step 6—By a using the Vector File Type, the System retrieves the data from the Media Object.

Step 7—The System loads the Media Object's URL and attempts to reach the URL to play the Media Object.

Step 8—System plays the Media URL.

Step 9—If URL not valid, system plays Media Object using DOM method as described in FIG. 1.

This method of playing Media Objects is different from conventional Media Players in two ways:

1. Conventional Media Players launch automatically when the user requests a Media Object to be played. The Client Computer uses the "file type" or "mime type" to identify which Media Player should be invoked. In the current embodiment of the invention, the System allows the User to select the Media Player dynamically without regard for the "file type" or "mime type".
2. Conventional Media Players do not easily offer the user the ability to continue surfing the web when a Media Object is playing. Conventional Media Players require the user to view the Media Object within the web page upon which it is found or within a stand-alone software console. In the current embodiment of the invention, the System allows the User to elect to play the Media Object in a "Tile" within a "ToolBar" and continue to watch the Media Object while surfing to other web sites.

Pseudo Code—Media Player Using URL or Vector Information

The following pseudo code outlines the method used in the current embodiment of the invention:

```
Boolean PlayMedia(MondoMedia media)
{
    // Web Browser will try to navigate to media URL
    if (mWebBrowser.NavigateTo(media.URL))
    {
        // try to locate the object on the page
        HTMLDocument document = mWebBrowser.HTMLDocument;
        HTMLObjectElement media_object =
document.getElementById(mediaVector.id);
        if (media_object == null)
        {
            media_object =
document.getElementByTitle(mediaVector.title);
            if (media_object == null)
                media_object =
document.getElementByIndex(mediaVector.sourceIndex);
        }
        If (media_object != null)
        {
            mWebBrowser.ScaleTo(media_object.id);
            return true;
        }
        else
            return false;
    }
    else
        return false;
}
Boolean MondoMedia_Play(MondoMedia media)
{
    // The Media Player will attempt to play the media using the
original media URL
    if (!PlayMedia(media.MediaURL))
    {
        // the player can not play the media
        MondoMediaVector mediaVector = media.GetMediaVector;
        // load the web page where the media URL is extracted from
        HTTPRequest request = new HTTPRequest( );
        request.Navigate(mediaVector.ReferenceURL)
        if (request.Response != successful)
        {
            //prompt the user about the page is no longer valid
            return false;
        }
        // produce DOM using the HTML page retrieved from the web page
        HTMLDocument document = new
HTMLDocument(request.Response)
        // try to locate the object on the page
        HTMLObjectElement media_object =
document.getElementById(mediaVector.id);
        if (media_object == null)
        {
            media_object =
document.getElementByTitle(mediaVector.title);
            if (media_object == null)
                media_object =
document.getElementByIndex(mediaVector.sourceIndex);
        }
        newMediaVector = RetrieveMediaVectorInfo(mediia_object);
        media.SetMediaVector(newMediaVector);
        PlayMedia(media);
    }
}
```

Saving Media URLs and Vectors in Media Lists

In the current embodiment of the invention, the System allows a User to collect lists of Media Objects containing the URL and Vector information.

If the User mouses over a Media Object, sees the Media List button and clicks on the Media List Button (as indicated in the section entitled "Mouse Over and Click Event"), the URL and Vector of the Media Object are passed to a table called a Media List Table. The User is given two options:

1. Playing the Media List by passing the contents of the "Media List Table" to the Media Player in the same manner described in the section on "Media Player Using URL or Vector Information".
2. Saving the Media List in a "Media Management System" on the Server Computer.

Figure 12:
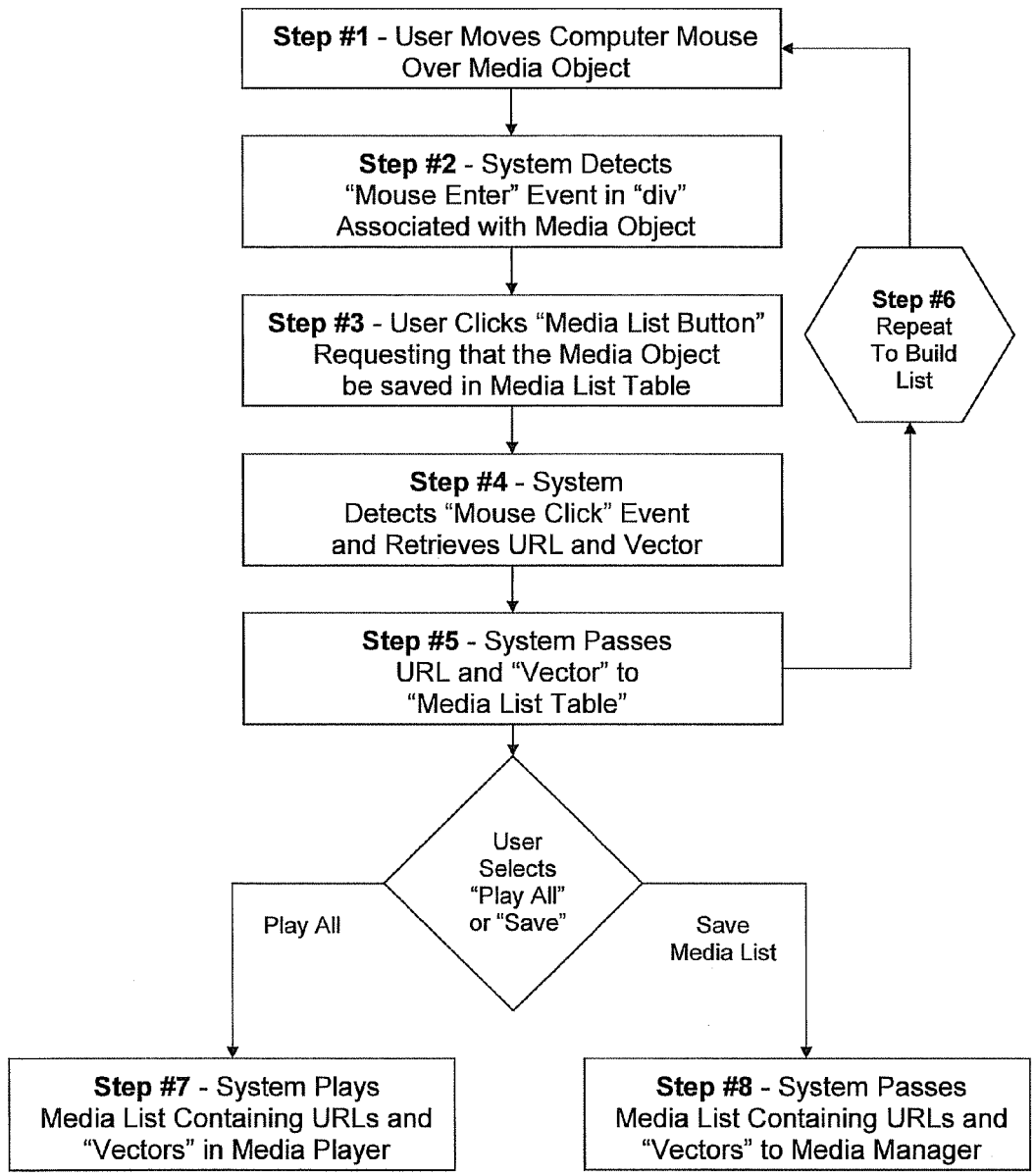
FIG. 12 is a flowchart illustrating the method of saving media URLs and vectors in media lists.

In the current embodiment of the invention the User can play or save Media Lists in the following manner (see FIG. 12):

Step 1—User moves mouse over a Media Object.

Step 2—System detects the mouse entering the area of the "div" surrounding the Media Object and displays the Media List button.

Step 3—User clicks mouse over the Media List button (as indicated in the section entitled "Mouse Over and Click Event").

Step 4—System detects the Mouse Click Event and retrieves the URL and Vector of the Media Object.

Step 5—System passes the URL and Vector to the Media List Table.

Step 6—User repeats the first 5 steps until he/she has built a desired list of Media.

Step 7—If the User clicks on the "Play Button" the System passes the Media List Table to the Media Player and the Media URLs and Vectors are played in succession in a manner described in the section entitled "Media Player Using URL, or Vector Information".

Step 8—If the User clicks on the "Save Button" the System passes the Media List Table to the Media Manager web page on the Server Computer, where the user can elect to save the Media List for future viewing or to share the Media List with other users.

Playing Media Lists

In the current embodiment of the invention, the system is designed to allow users to play lists of Media Objects, such as:

1. Video—A list of Video Media, where the user can either select specific Video Media or can play all of the Video "Media Lists" in the list in sequence without having to execute each object individually.
2. Audio—A list of Audio Media, where the user can either select specific Audio Media or can play all of the Audio Media in the list in sequence without having to execute each object individually.
3. RSS—A list of RSS Media where the user can either select a specific RSS Media or can play a concurrent mixture of RSS streams.

When a Media List is played, the URL and "Vector" information for each item in the list is passed to the Media Player and played in succession within a single "Tile" in the manner described in the section entitled "Media Player Using URL and Vector Information".

Managing Media Lists

In the current embodiment of the invention, the Server Computer is equipped with a web page interface that allows the User to organize the Media Objects into lists.

Additionally, the User can attribute meta tags to the Media List that further identify the Media List and allow other users to search for the Media List based upon criteria which may or may not have been obvious to a web crawler when the Media Objects were originally located on a web page.

Figure 13:
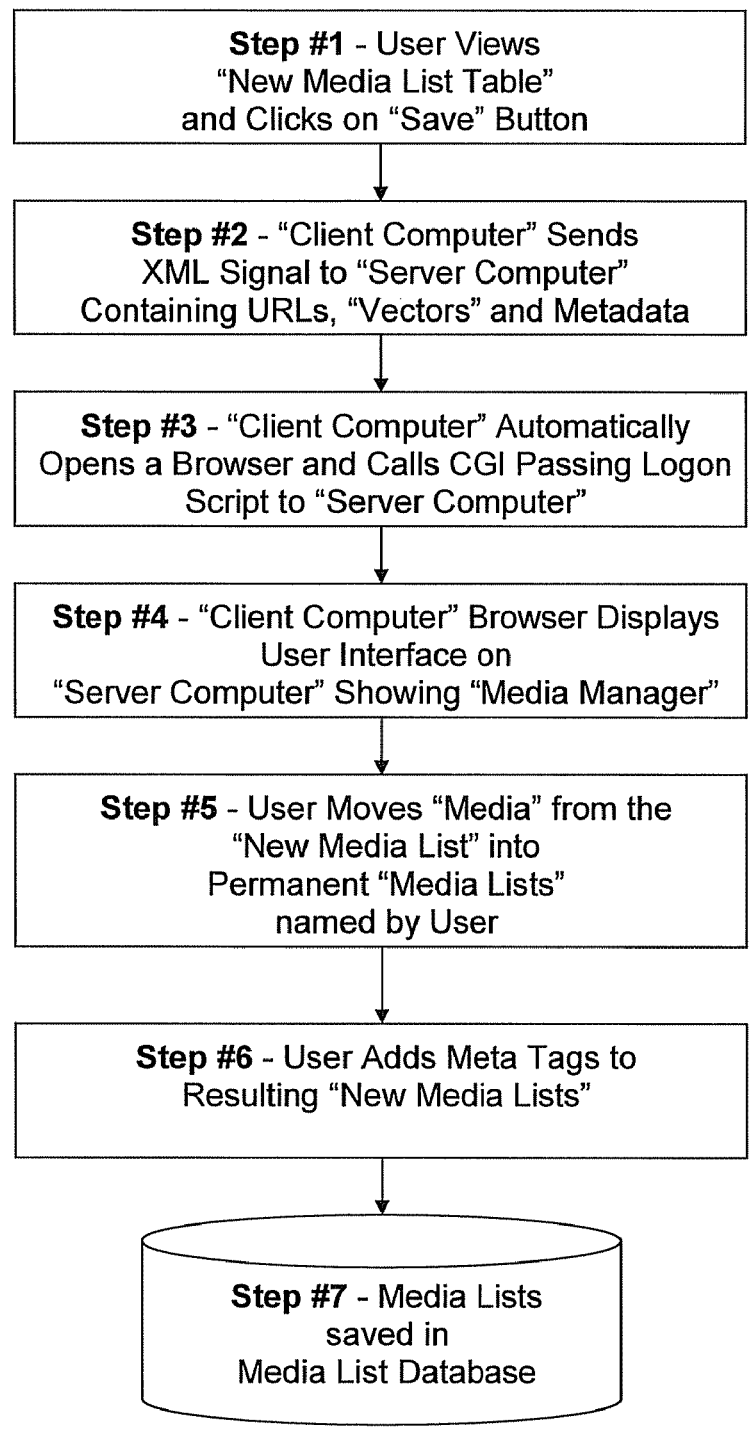
FIG. 13 is a flowchart illustrating the method of managing media lists.

The process works in the following manner (described in FIG. 13):

Step 1—The User views a Media List contained in the Media List Table on the Client Computer. For the purposes of this description, this Media List is called the "New Media List".

Figure 17:
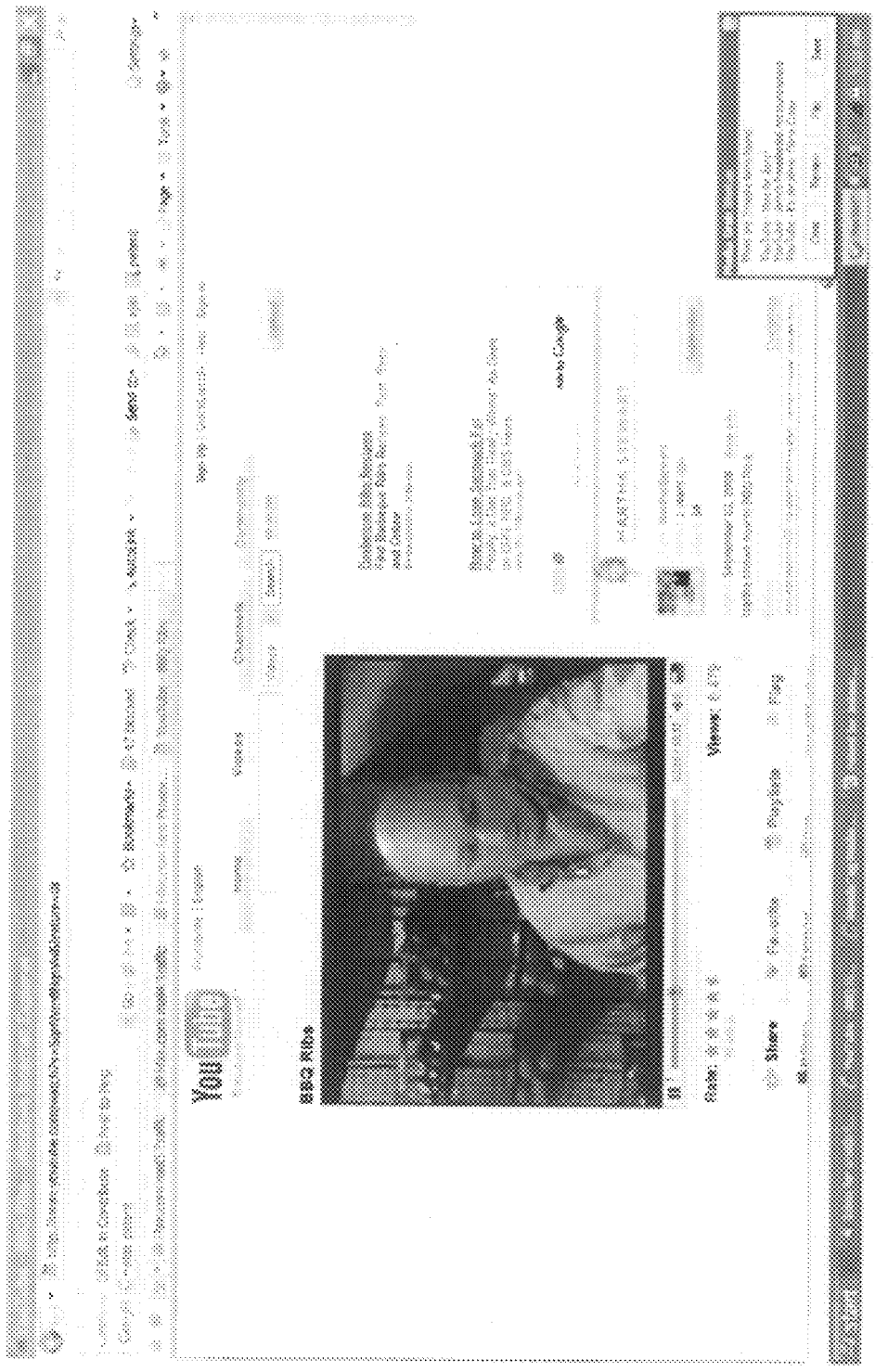
FIG. 17 is a screen shot illustrating a web page containing a Media Object and a Temporary Media List in the bottom right hand corner of the page.

The User decides to save the Media List for future viewing or to share with other users and presses the "Save Button" (see FIG. 17). In the Screen Shot provided, the New Media List appears in the bottom right hand corner of the screen with a Play and Save button at the bottom.

Step 2—Client Computer sends an XML signal to the Server Computer containing the URLs and Vectors and Metadata of the Media Objects that were captured by the User in the Media List Table on the Client Computer.

Step 3—Client Computer automatically opens a browser session and calls a CGI that automatically passes log on information to the Server Computer.

Figure 18:
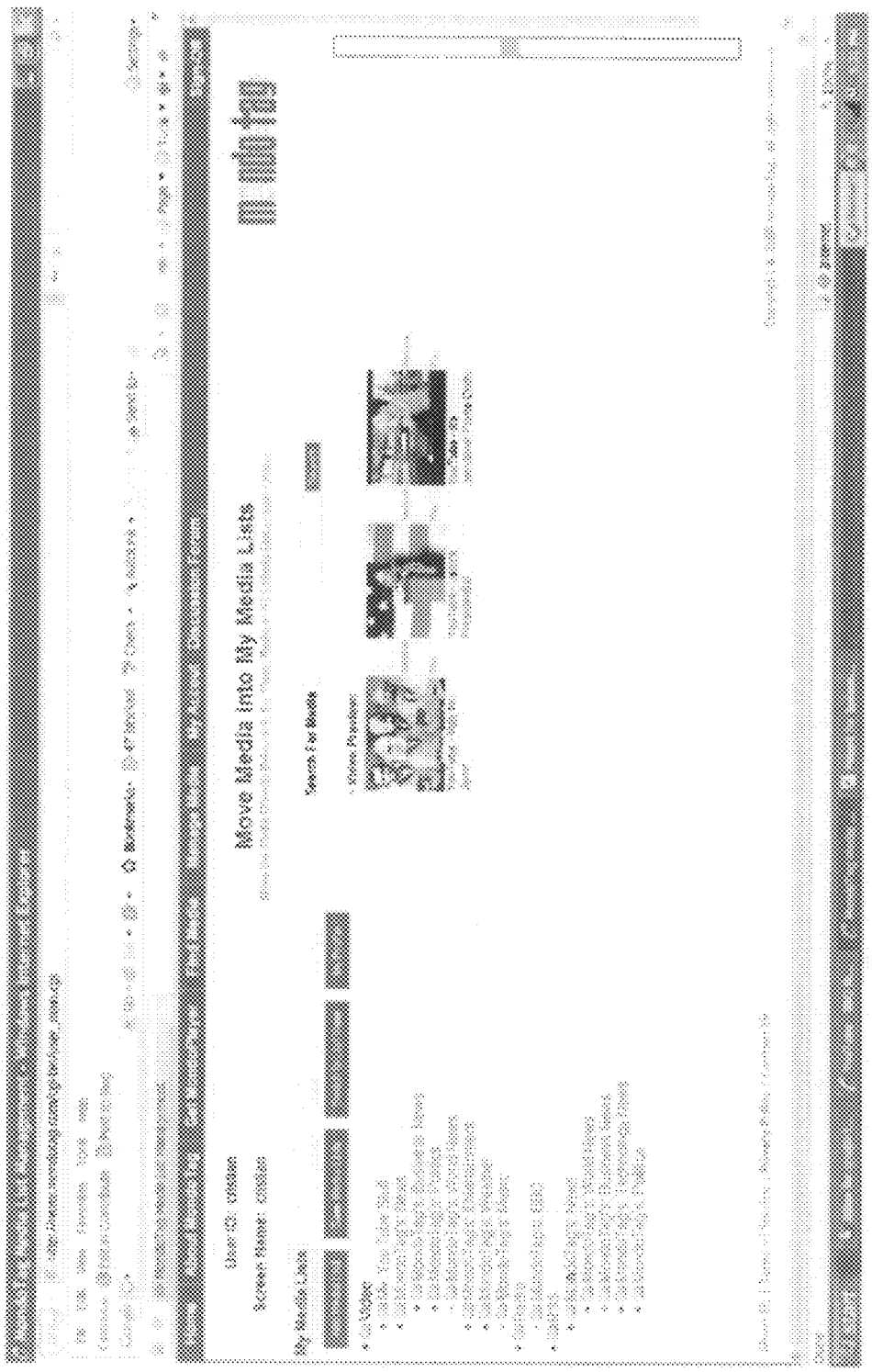
FIG. 18 is a screen shot illustrating an interface where a Temporary Media List can be copied into a Media List and saved using a drag and drop interface.

Step 4—The Client Computer's browser displays a user interface on the Server Computer showing the New Media List in the Media Manager (see FIG. 18).

Step 5—The user interface allows the User to move Media Objects from the New Media List into permanent Media Lists named by the User. The interface makes use of a standard GUI containing folders that are named with the names of permanent Media Lists created by the User.

Step 6—The User can add meta tags to the permanent Media Lists created by the User. The meta tags are words that can be used in the future by other users to search for and locate the Media List.

The User can save the permanent Media Lists in his or her account on the web page.

Subscribing to Media Lists

In the current embodiment of the invention Users can search for and subscribe to Media Lists that are created by other Users.

Figure 14:
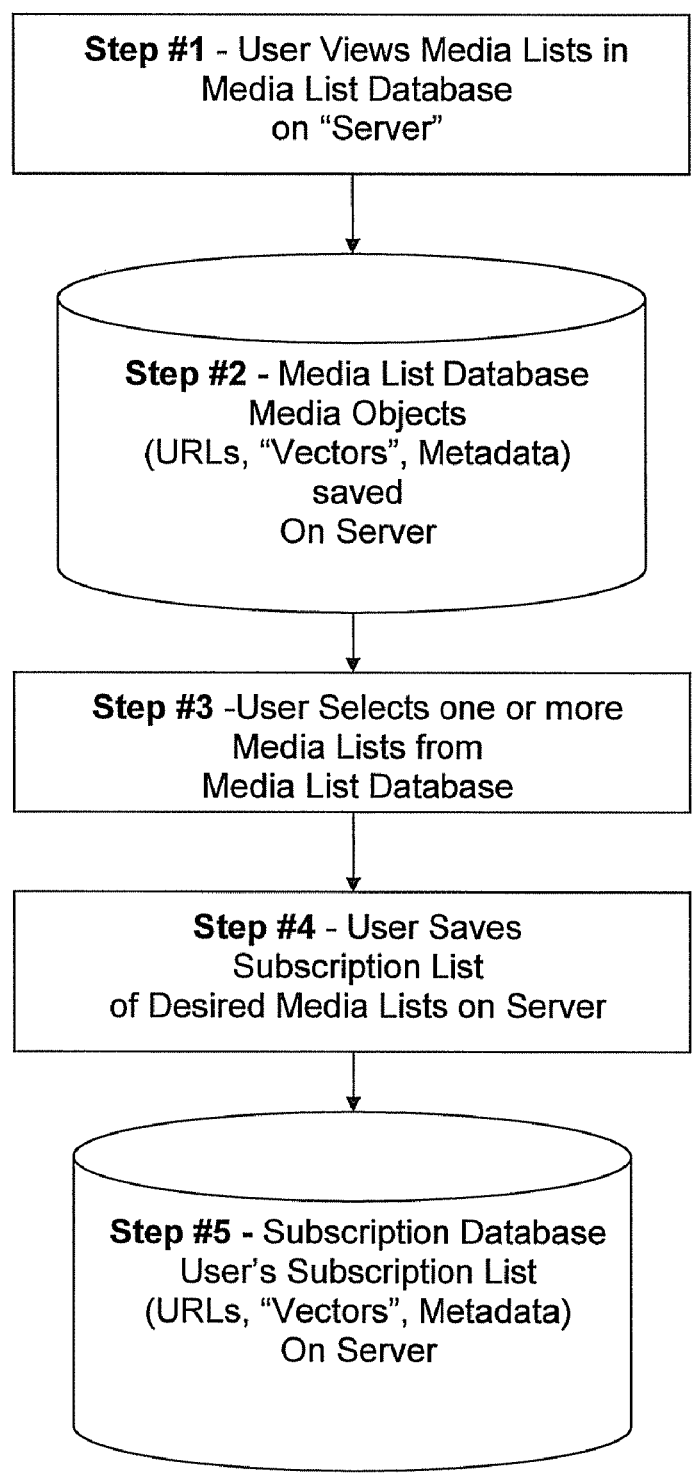
FIG. 14 is a flowchart illustrating the method of subscribing to media lists.

The process works as follows (see FIG. 14):

Step 1—User views a Media List in a database on the Server Computer called the Media List Database.

Step 2—The Media List Database contains the following information for each Media Object:
a. URL for Media
b. Vector
c. Metadata (derived from the web page from which the URL and Vector were obtained)
d. Meta Tags (inputted by the User who created the Media List)
e. Name of Media List (assigned by the User who created the Media List)

Step 3—User selects one or more of the Media Lists from the Media List Database and saves the Media Lists in the User's account.

Step 4—User clicks the Save Media List button indicating an intention to save the Media List or Media Lists in the Subscription Database.

Step 5—The User's account contains a record in the Subscription Database on the Server Computer that contains the same fields as the Media List Database. This data is also held on the Client Computer in the Media Player.

Distributing Media Lists

In the current embodiment of the invention Users who Subscribe to Media Lists created by other Users can receive automatic updates to the Media Lists on their Media Player when the "Author" of a Media List makes a change. The Author of a Media List is the User who created the Media List and saved it in the Media List Database as described in the section entitled "Managing Media Lists".

Figure 15:
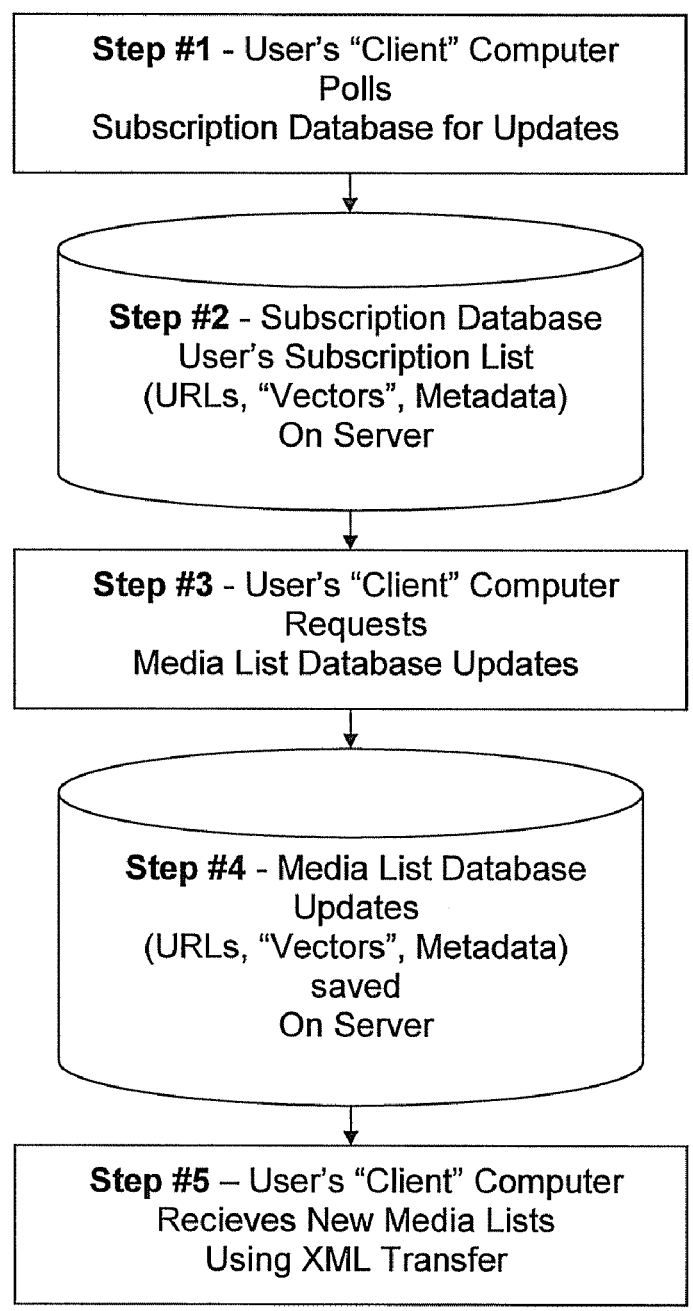
FIG. 15 is a flowchart illustrating the method of distributing media lists.

The process works as follows (see FIG. 15):

Step 1—User's Client Computer sends an XML signal to the Server Computer checking the Subscription Database for updates made by the Author of the Media Lists. This signal may be sent when the Client Computer boots or when the User plays the Media List in question.

Step 2—The Subscription Database points to the Media List Database and automatically is updated when changes are made by the Author of the Media Lists in question.

Step 3—The User's Client Computer instructs Server Computer to build a list of Media Lists requiring an update, due to changes made by the Author.

Step 4—Server Computer prepares a table of Media Lists for transmission.

Step 5—Client Computer receives the updated Media Lists in an XML signal from the Server Computer and updates the Media Player.

Detecting the End of a Media Object

In the current embodiment of the invention, the system is capable of detecting the end of a video playing in a POD by means of a process that regularly samples the image and audio produced by the Media Object looking for an indication the object has ended.

This capability has two uses:

1. When a video or audio Media Object reaches its end, it is desirable to close the session and start the next video or audio Media Object in a Media List. A method for determining the end of the Media Object is therefore desirable.

2. When a video or audio Media Object is referenced by the POD it is possible the Media Object will no longer be present. If the link containing the Media Object is broken, the system will have no difficulty detecting the absence of the video or audio, but in cases where the link and the web page are present, a system that can detect the absence of movement or sound is necessary to establish that the Media Object is obsolete.

Media Objects tend to exhibit the following symptoms when they have reached their end point or are obsolete:

1. The image of the video becomes static such as a blank screen or a snap shot and/or the audio becomes silent.

2. The image of the video or the audio becomes repetitive, such as a giggling graphic or a short video that repeats.

Figure 16:
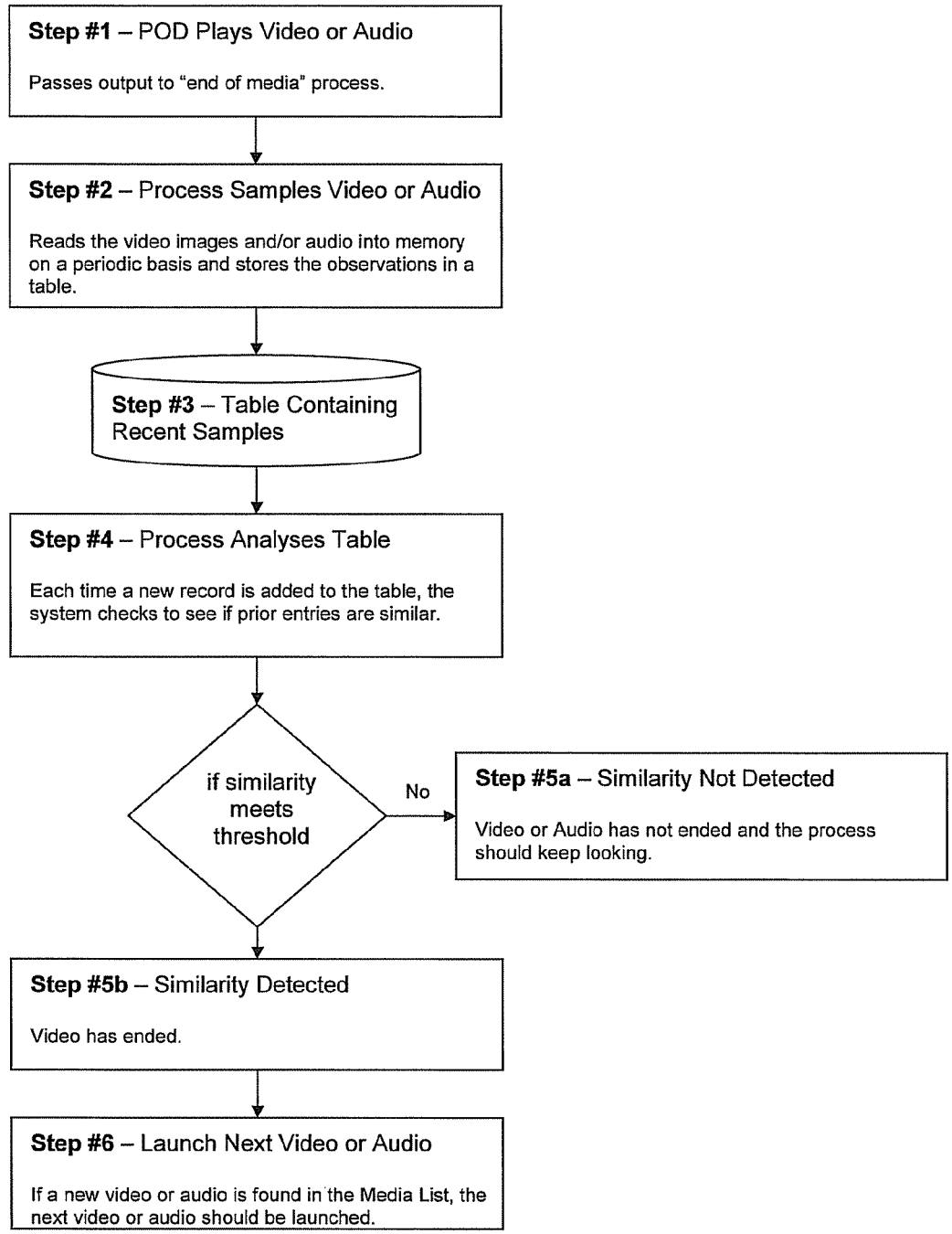
FIG. 16 is a flowchart illustrating the method of detecting the end of a media object.

The process works as follows (see FIG. 16):

Step 1—POD plays video or audio and passes the output to a process that looks for the "end of media".

Step 2—The "end of media" process samples the image and/or audio and stores a "snap shot" in a table.

Step 3—The table contains records of the last "n" number of observations captured by the "end of media" process.

Step 4—The "end of media" process analyses the records in the table to determine whether images and/or audio are recurring in a pattern that indicates the Media Object has ended.

Step 5—The "end of media" process continues execution if similarity cannot be found (see 5a) or ends the execution of the Media Object (see 5b).

Step 6—Upon ending the execution of the Media Object, the "end of media" process starts the next Media Object in a Media List.

Pseudo Code—Detecting the End of a Media Object

The following pseudo code outlines the method used in the current embodiment of the invention:

```
class MondoPodApp
{
    MondoEndStreamDectector mEndStreamDetector;
    Timer timerEndStreamDetect;
    void PlayMedia(MondoMedia media)
    {
        // Perform normal play media operations
        // ....
        // Reset FrameFrozenDetector and start the timer
```

-continued

```
        this.mEndStreamDetector.Reset( );
        this.timerEndStreamDetect.Enabled = true;
    }
    void timerFrozenFrameDetect_Tick(object sender, EventArgs e)
    {
        MondoMedia media = this.CurrentPlyMedia;
        if (media.Type is Video)
        {
            Bitmap frame = this.webBrowser.GetFrame( );
            if (this.mEndStreamDetector.IsFrameFrozen(frame))
            {
                this.timerEndStreamDetect.Stop( );
                EndOfStream( );
            }
        }
        else (media.Type is Audio)
        {
            AudioBuffer buffer = this.webBrowser.GetAudioBuffer( );
            if (this.mEndStreamDetector.IsAudioBufferSilent(buffer))
            {
                this.timerEndStreamDetect.Stop( );
                EndOfStream( );
            }
        }
    }
    void EndOfStream( )
    {
        if (mPlayList.MediaItems.Count == 1)
        {
            PlayMedia(this.CurrentPlayMedia);
        }
        else if (mPlayList.MediaItems.Count > 1)
        {
            // it is a play list, close
            PlayMedia(this.NextPlayMedia);
        }
    }
}
class MondoEndStreamDetector
{
    const int MaxSameFrameCount = n;
    const int MaxSilentBufferCount = n;
    private Bitmap mOrigalFrame = null;
    private int mSameFrameCount = 0;
    private int mSilentBufferCount = 0;
    public void Reset( )
    {
        mOrigalFrame = null;
        mSameFrameCount = 0;
        mSilentBufferCount = 0;
    }
    public Boolean IsFrameFrozen(Bitmap frame)
    {
        if (FrameEquals(mOrigalFrame, frame))
            mSameFrameCount++;
        else
        {
            if (null != frame)
                mOrigalFrame = (Bitmap)frame.Clone( );
            else
                mOrigalFrame = null;
            mSameFrameCount = 0;
        }
        return mSameFrameCount >= MaxSameFrameCount;
    }
    public Boolean IsAudioBufferSilent(AudioBuffer buffer)
    {
        if (AudioBufferSilent(buffer))
            mSilentBufferCount++;
        else
            mSilentBufferCount = 0;
        return mSilentBufferCount >= MaxSilentBufferCount;
    }
}
```

While a number of exemplary aspects and embodiments have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations as are within their true spirit and scope.

What is claimed is:

1. A computer implemented method for a user provided with a computer to select and play media objects in the Document Object Model ("DOM") of a web page displayed on a user's computer, wherein each user's computer has a memory and a computer display able to provide a user interface and being accessible via the Internet to web pages containing said media objects using a web browser, a media player and user input means comprising a user pointing device for manipulating a displayed pointer, the method comprising:

i) identifying each Media Object in the DOM rendered by said web browser for a displayed web page;
ii) providing means to visually identify each said Media Object in the DOM to said user;
iii) receiving a selection of a Media Object for a user to view, made with said pointing device;
iv) assembling and storing in memory a Vector Record for said selected Media Object in the DOM, wherein said Vector Record contains:
   a. a URL associated with each selected Media Object in the DOM;
   b. information about the location of the selected Media Object, selected from the group consisting of:
      i. the URL of the surrounding web page on which the selected Media Object is found;
      ii. the title of the selected Media Object;
      iii. the ordinal position of the selected Media Object in source order as the selected Media Object appears in the DOM;
      iv. the ID associated with the selected Media Object on the web page;
      v. the file type of the selected Media Object;
      vi. the tag name of the selected Media Object;
      vii. the position of the pointer in the DOM during said selection step; and
      viii. the most recent series of selection events prior to said selection step;
v) retrieving the Vector Record for the selected Media Object and obtaining the URL for the web page and the location of the selected Media Object on the web page from said Vector Record;
vi) opening a window or frame within which to display the selected Media Object;
vii) starting a browser session as a background process;
viii) loading the web page containing the selected Media Object into the background session of the browser using the URL obtained from the Vector Record;
ix) navigating to the location of the selected Media Object on the web page loaded in the background browser using the information obtained from the Vector Record;
x) scaling the selected Media Object to fit the window or frame; and
xi) displaying the selected Media Object in said window or frame;

wherein a plurality of Media Objects are selected, each selection using a unique computer-implemented process having a unique process ID; and each said unique computer-implemented process is adapted to write sound records to the operating system of the user's computer, said sound records each being identified by one of said unique process IDs corresponding to the source of the sound record.

2. The method of claim 1 wherein said means to visually identify each said Media Object in the DOM to said user comprises a graphic element adapted to be displayed when said pointing element is sufficiently close to said Media Object.

3. The method of claim 2 wherein said graphic element comprises a Play button.

4. The method of claim 2 wherein said selection of a Media Object to view is done by a mouse click.

5. The method of claim 2 wherein the Media Object is played in a toolbar or console.

6. The method of claim 1 wherein multiple media objects are selected from one or more web pages, steps ii) through xi) are carried out for each selected Media Object, wherein a unique background browser session is implemented for each said selected Media Object; and wherein a system manager is provided which puts a place holder inside software applications into which the multi-media content can be directed; and directs the multi-media content to any software application running in the foreground that contains a place holder to thereby play said multiple media objects simultaneously.

7. The method of claim 6 wherein a plurality of said multiple media objects emit sound, and said system manager controls whether sound is on or off for each of said multiple media objects individually.

8. The method of claim 1 wherein software is inserted around each Media Object in a "div" that enables the system to display one or more targets comprising one or more graphic elements to the user when the user places the pointer over the Media Object in the DOM, and the software inserted into the DOM records instances where the user clicks on said one or more graphic elements for a specific Media Object.

9. The method of claim 8 wherein said one or more graphic elements initiate either the playing of said Media Object or saving said Media Object in a Media List.

10. The method of claim 1 wherein the end of the media is detected when it stops playing by carrying out the following steps:
   i) the computer-implemented means for carrying out the method of claim 1 plays a video or audio media object and passes the output to an end-detecting process that looks for the end of the media object file;
   ii) the end-detecting process samples the image and/or audio and stores said sample in a table in memory;
   iii) the table contains records of the last "n" number of observations captured by the end-detecting process;
   iv) the end-detecting process analyses the records in the table to determine whether images and/or audio are recurring in a pattern that indicates the Media Object has ended;
   v) the end-detecting process continues execution if similarity cannot be found or ends the execution of the Media Object;
   vi) upon ending the execution of the Media Object, the end-detecting process starts the next Media Object in a Media List.

11. The method of claim 1 wherein the system detects when a Media Object has been deleted or the web page layout changed.

12. The method of claim 1 wherein said selected Media Object includes pre-recorded instructions for playing said selected Media Object, and wherein said pre-recorded instructions are obtained from the actions of said user in playing said Media Object in association with the position of the pointer in the DOM during said selection step, and the most recent series of selection events prior to said selection step; and said pre-recorded instructions are stored in said Vector Record of said selected Media Object in association with the position of the pointer in the DOM during said selection step and the most recent series of selection events prior to said selection step and said pre-recorded instructions are executed in order to display said selected Media Object.

13. The method of claim 1 wherein the sound emitted by each Media Object is controlled by altering the sound records written to the operating system of the user's computer using said one of said unique process IDs to identify the source of the sound.

14. A computer readable storage medium having program code stored thereon, wherein the program code, when executed by a computer, performs the method of claim 1.

15. A computer program product comprising a computer readable medium having a computer readable code thereon, said computer program product permitting a user provided with a computer to select and play media objects in the Document Object Model ("DOM") of a web page displayed on a user's computer, wherein each user's computer has a memory and a computer display able to provide a user interface and being accessible via the Internet to web pages containing said media objects using a web browser, a media player and user input means comprising a user pointing device for manipulating a displayed pointer, the computer program product comprising:
   i) computer readable code to identify each Media Object in the DOM rendered by said web browser for a displayed web page;
   ii) computer readable code to visually identify each said Media Object in the DOM to said user;
   iii) computer readable code for said User to select with said pointing device a Media Object to view;
   iv) computer readable code for assembling and storing in memory a Vector Record for said selected Media Object in the DOM, wherein said Vector Record contains:
      a. a URL associated with each selected Media Object in the DOM;
      b. information about the location of the selected Media Object, selected from the group consisting of:
         I. the URL of the surrounding web page on which the selected Media Object is found;
         ii. the title of the selected Media Object;
         iii. the ordinal position of the selected Media Object in source order as the selected Media Object appears in the DOM;
         iv. the ID associated with the selected Media Object on the web page;
         v. the file type of the selected Media Object;
         vi. the tag name of the selected Media Object;
         vii. the position of the pointer in the DOM during said selection step; and
         viii. the most recent series of selection events prior to said selection step;
   v) computer readable code for retrieving the Vector Record for the selected Media Object and obtaining the URL for the web page and the location of the selected Media Object on the web page from said Vector Record;
   vi) computer readable code for opening a window or frame within which to display the selected Media Object;
   vii) computer readable code for starting a browser session as a background process;
   viii) computer readable code for loading the web page containing the selected Media Object into the background session of the browser using the URL obtained from the Vector Record;
   ix) computer readable code for navigating to the location of the selected Media Object on the web page loaded in the background browser using the information obtained from the Vector Record;

x) computer readable code for scaling the selected Media Object to fit the window or frame; and xi) computer readable code for displaying the selected Media Object in said window or frame;

and further comprising computer readable code for selecting a plurality of Media Objects, each selection using a unique computer-implemented process having a unique process ID; and wherein each said unique computer-implemented process is adapted to write sound records to the operating system of the user's computer, said sound records each being identified by one of said unique process IDs corresponding to the source of the sound record.

16. The computer program product of claim 15 wherein said means to visually identify each said Media Object in the DOM to said user comprises a graphic element adapted to be displayed when said pointing element is sufficiently close to said Media Object.

17. The computer program product of claim 16 wherein said graphic element comprises a Play button.

18. The computer program product of claim 17 wherein said selection of a Media Object to view is done by a mouse click.

19. The computer program product of claim 15 wherein the Media Object is played in a toolbar or console.

20. The computer program product of claim 15 further comprising computer readable code for selecting multiple media objects from one or more web pages, for implementing a unique background browser session for each said selected Media Object; and for providing a system manager which puts a place holder inside software applications into which the multi-media content can be directed; and directs the multi-media content to any software application running in the foreground that contains a place holder to thereby play said multiple media objects simultaneously.

21. The computer program product of claim 20 wherein a plurality of said multiple media objects emit sound, and said computer readable code permits said system manager to control whether sound is on or off for each of said multiple media objects individually.

* * * * *